United States Patent
Seki et al.

(10) Patent No.: US 9,674,918 B2
(45) Date of Patent: Jun. 6, 2017

(54) ILLUMINATION SYSTEM AND LUMINAIRE

(71) Applicant: Panasonic Intellectual Property Management Co., Ltd., Osaka (JP)

(72) Inventors: Keisuke Seki, Osaka (JP); Akinori Hiramatsu, Nara (JP); Hiroshi Kido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/988,182

(22) Filed: Jan. 5, 2016

(65) Prior Publication Data

US 2016/0205741 A1 Jul. 14, 2016

(30) Foreign Application Priority Data

Jan. 9, 2015 (JP) .................................. 2015-003628
Jan. 9, 2015 (JP) .................................. 2015-003679

(51) Int. Cl.
*H05B 33/08* (2006.01)

(52) U.S. Cl.
CPC ....... *H05B 33/0866* (2013.01); *H05B 33/086* (2013.01); *H05B 33/0827* (2013.01)

(58) Field of Classification Search
CPC ............ H05B 33/0815; H05B 33/0818; H05B 33/0884; H05B 33/0809; H05B 33/0848; H05B 33/0896
USPC .......................... 315/294, 307, 122, 192, 224
See application file for complete search history.

(56) References Cited

U.S. PATENT DOCUMENTS

| | | | | |
|---|---|---|---|---|
| 2007/0159750 A1* | 7/2007 | Peker | ................. | H05B 33/0869 361/93.1 |
| 2009/0134817 A1* | 5/2009 | Jurngwirth | ......... | H05B 33/0851 315/307 |
| 2010/0052569 A1* | 3/2010 | Hoogzaad | .......... | H05B 33/0818 315/294 |
| 2010/0141162 A1* | 6/2010 | Matsumoto | ........ | H05B 33/0818 315/186 |

(Continued)

FOREIGN PATENT DOCUMENTS

JP  5426802  12/2013
WO  WO 2013/118208 A1  8/2013

*Primary Examiner* — Douglas W Owens
*Assistant Examiner* — Syed M Kaiser
(74) *Attorney, Agent, or Firm* — Renner, Otto, Boisselle & Sklar, LLP

(57) ABSTRACT

An illumination system includes: a first light-emitting element column including one of a single first light-emitting element or a plurality of first light-emitting elements connected in series; a second light-emitting element column connected in parallel with the first light-emitting element column, and including one of a single second light-emitting element or a plurality of second light-emitting elements connected in series; a constant current supply that supplies a constant current to the first light-emitting element column and the second light-emitting element column which are connected in parallel; a resistor that is connected in series with the first light-emitting element column, and detects a magnitude of current flowing through the first light-emitting element column; and a current adjuster circuit that adjusts the magnitude of the current flowing through the first light-emitting element column, according to the magnitude of the current detected by the resistor.

23 Claims, 28 Drawing Sheets

(56) References Cited

U.S. PATENT DOCUMENTS

| | | | |
|---|---|---|---|
| 2011/0068701 A1* | 3/2011 | van de Ven et al. | H05B 33/083 |
| | | | 315/185 R |
| 2011/0068702 A1* | 3/2011 | van de Ven et al. | H05B 33/0854 |
| | | | 315/186 |
| 2011/0121654 A1* | 5/2011 | Recker | H02J 9/065 |
| | | | 307/66 |
| 2011/0309760 A1* | 12/2011 | Beland | H02M 1/4258 |
| | | | 315/201 |
| 2012/0081009 A1* | 4/2012 | Shteynberg | H05B 33/083 |
| | | | 315/122 |
| 2012/0200229 A1* | 8/2012 | Kunst | H05B 33/0815 |
| | | | 315/186 |
| 2012/0212143 A1* | 8/2012 | Esaki | H05B 33/089 |
| | | | 315/192 |
| 2012/0306386 A1* | 12/2012 | Oshima | H05B 33/0887 |
| | | | 315/185 R |
| 2013/0009561 A1* | 1/2013 | Briggs | G01R 19/0092 |
| | | | 315/210 |
| 2013/0038222 A1* | 2/2013 | Yeh | H05B 33/0824 |
| | | | 315/152 |
| 2014/0159598 A1* | 6/2014 | Boezen | H05B 33/0848 |
| | | | 315/193 |
| 2014/0361711 A1 | 12/2014 | Takahashi | |
| 2015/0312983 A1* | 10/2015 | Hu | F21K 9/1355 |
| | | | 315/186 |

* cited by examiner

ILLUMINATION SYSTEM AND LUMINAIRE

CROSS REFERENCE TO RELATED APPLICATIONS

This application claims the benefit of priority of Japanese Patent Application Number 2015-003628 filed on Jan. 9, 2015 and Japanese Patent Application Number 2015-003679 filed on Jan. 9, 2015, the entire contents of which are hereby incorporated by reference.

BACKGROUND

1. Technical Field

The present disclosure relates to an illumination system and a luminaire using the illumination system.

2. Description of the Related Art

Among conventional luminaires, there are luminaires which include a light source unit having light-emitting elements of plural colors (see, for example, Patent Literature (PTL) 1: Japanese Patent No. 5426802). In the light source unit of the luminaire disclosed in PTL 1, a first light-emitting element column in which first light-emitting elements are connected in series, and a second light-emitting element column in which second light-emitting elements are connected in series, are connected in parallel. A first light-emitting element and a second light-emitting element have different color temperatures. In such a luminaire, various color toning can be performed by, for example, changing the light-emitting ratio between plural light-emitting element columns.

SUMMARY

However, in the luminaire disclosed in PTL 1, the current flowing through the first light-emitting element column cannot be set to zero. In other words, turning OFF only the first light-emitting element column is not possible. Accordingly, since light from the first light-emitting element column is always present, there is the problem that the color toning range is not sufficiently broad. As such, there is a demand for further broadening of the color toning range in luminaires.

In view of this, an object of the present disclosure is to provide an illumination system, a lighting apparatus, and a luminaire which allow broadening of the color toning range.

In order to achieve the above object, an illumination system according to an aspect of the disclosure includes: a first light-emitting element column including one of a single first light-emitting element or a plurality of first light-emitting elements connected in series; a second light-emitting element column connected in parallel with the first light-emitting element column, and including one of a single second light-emitting element or a plurality of second light-emitting elements connected in series; a constant current supply that supplies a constant current to a light source unit that includes the first light-emitting element column and the second light-emitting element column; a first detector circuit that is connected in series with the first light-emitting element column, and detects a magnitude of current flowing through the first light-emitting element column; and a current adjuster circuit that adjusts the magnitude of the current flowing through the first light-emitting element column, according to the magnitude of the current detected by the first detector circuit.

Furthermore, in order to achieve the above object, a lighting apparatus according to an aspect of the present disclosure is a lighting apparatus that supplies current to a plurality of light-emitting element columns, and includes: a common terminal; a plurality of branch terminals; a constant current supply that supplies current to the plurality of light-emitting element columns such that a sum of currents flowing from the common terminal to the plurality of branch terminals is constant, when the plurality of light-emitting element columns are connected between the common terminal and a respective different one of the plurality of branch terminals; and a current adjustor circuit that adjusts a magnitude of current flowing from the common terminal to at least one of the plurality of branch terminals.

Illumination systems, lighting apparatuses, and luminaires according to the present disclosure allow broadening of the color toning range.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENTS (Details of the Problem and Underlying Knowledge Forming Basis of the Present Disclosure)

Figure 1:
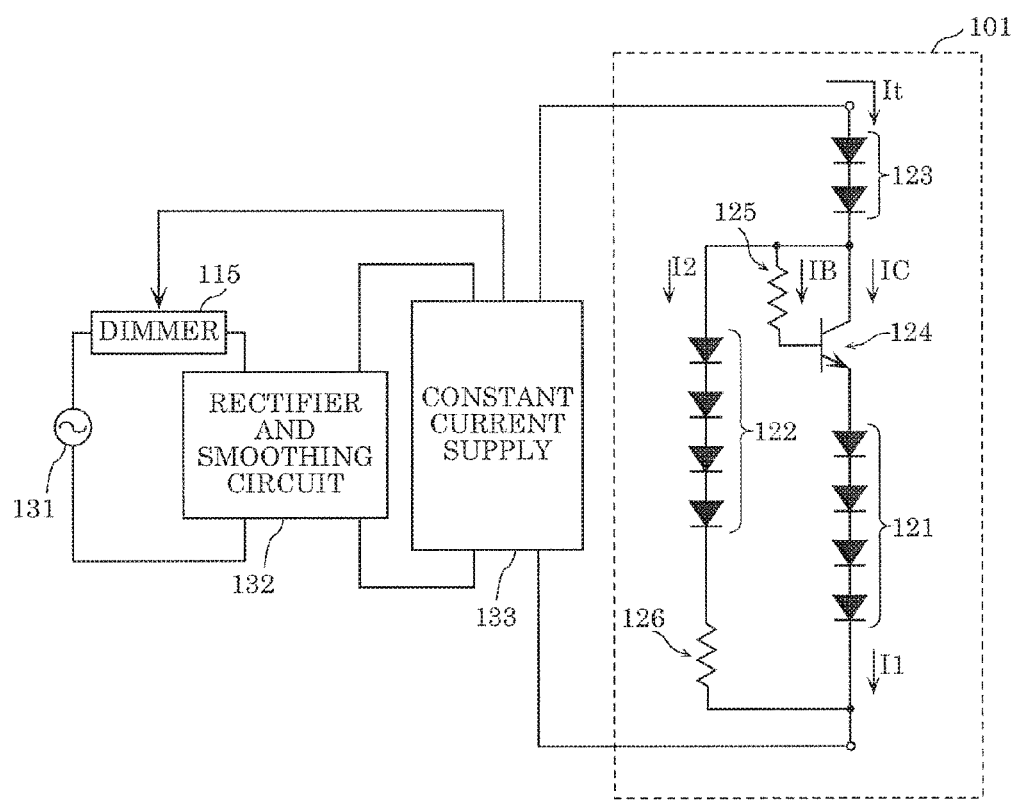
FIG. 1 is a circuit diagram illustrating a circuit configuration of a luminaire in a comparative example.

FIG. 1 is a circuit diagram illustrating, as a comparative example, the circuit configuration of a luminaire disclosed in PTL 1.

The luminaire disclosed in PTL1 includes alternating current (AC) power supply 131, dimmer 115, rectifier and smoothing circuit 132, constant current supply 133, and lighting circuit 101.

AC power supply 131 supplies AC voltage to the luminaire. Dimmer 115 is a circuit that adjusts the magnitude (amount) of the current that is supplied to lighting circuit 101, by changing the input voltage to rectifier and smoothing circuit 132 according to a dimming operation from the outside. By changing the input voltage to rectifier and smoothing circuit 132, the magnitude of the current to be outputted from constant current supply 133 can, as a result, be adjusted.

Lighting circuit 101 includes cool color light-emitting diode (LED) column 121, warm color LED column 122, LED column 123, bipolar transistor 124, and resistors 125 and 126.

Lighting circuit 101 includes parallel circuits in which a first serial circuit in which cool color LED column 121 and bipolar transistor 124 are connected in series, and a second serial circuit in which warm color LED column 122 and resistor 126 are connected in series, are connected in parallel. LED column 123 is connected in series to the parallel circuits.

LED column 123 consists of two LEDs that are connected in series. In the subsequent description, the cathode terminal of the leading LED in the direction in which current flows is referred to as the cathode terminal of LED column 123, and the anode terminal of the trailing LED is referred to as the anode terminal of LED column 123. LED column 123 has the anode terminal connected to one end of constant current supply 133; and the cathode terminal connected to a collector terminal of bipolar transistor 124, one end of resistor 125, and the anode terminal of cool color LED column 122.

Resistor 125 has one end connected to the cathode terminal of LED column 123, the collector terminal of bipolar transistor 124, and the anode terminal of warm color LED column 122; and the other end connected to a base terminal of bipolar transistor 124.

Bipolar transistor 124 has the base terminal connected to the other end of resistor 125; an emitter terminal connected to the anode terminal of cool color LED column 121; and the collector terminal connected to an output node (node to which the cathode electrode is connected) of LED column 123.

Cool color LED column 121 consists of four cool color LEDs that are connected in series. In the subsequent description, the cathode terminal of the leading cool color LED is referred to as the cathode terminal of cool color LED column 121, and the anode terminal of the last cool color LED is referred to as the anode terminal of cool color LED column 121. Cool color LED column 121 has the anode terminal connected to the emitter terminal of bipolar transistor 124; and the cathode terminal connected to the other end of constant current supply 133 and one end of resistor 126.

Warm color LED column 122 consists of four warm color LEDs that are connected in series. In the subsequent description, the cathode terminal of the leading warm color LED is referred to as the cathode terminal of warm color LED column 122, and the anode terminal of the last warm color LED is referred to as the anode terminal of warm color LED column 122. Warm color LED column 122 has the anode terminal connected to the cathode terminal of LED column 123, the collector terminal of bipolar transistor 124, and the one end of resistor 125; and the cathode terminal connected to the other end of resistor 126.

Resistor 126 has one end connected to the other end of constant current supply 133 and the cathode terminal of cool color LED column 121; and the other end connected to the cathode terminal of warm color LED column 122.

In this luminaire, bipolar transistor 124 functions as a variable resistance element having a resistance that changes according to the magnitude of the current flowing through warm color LED column 122. A change in the resistance of bipolar transistor 124 causes the magnitude of the current flowing through cool color LED column 121 to change.

In other words, in the luminaire in PTL 1, the total of the currents flowing through cool color LED column 121 and warm color LED column 122 is the same as the magnitude of the output current of constant current supply 133, and dimming control is performed by changing the ratio of currents flowing through cool color LED column 121 and warm color LED column 122, according to the magnitude of the current flowing through warm color LED column 122.

Figure 2:
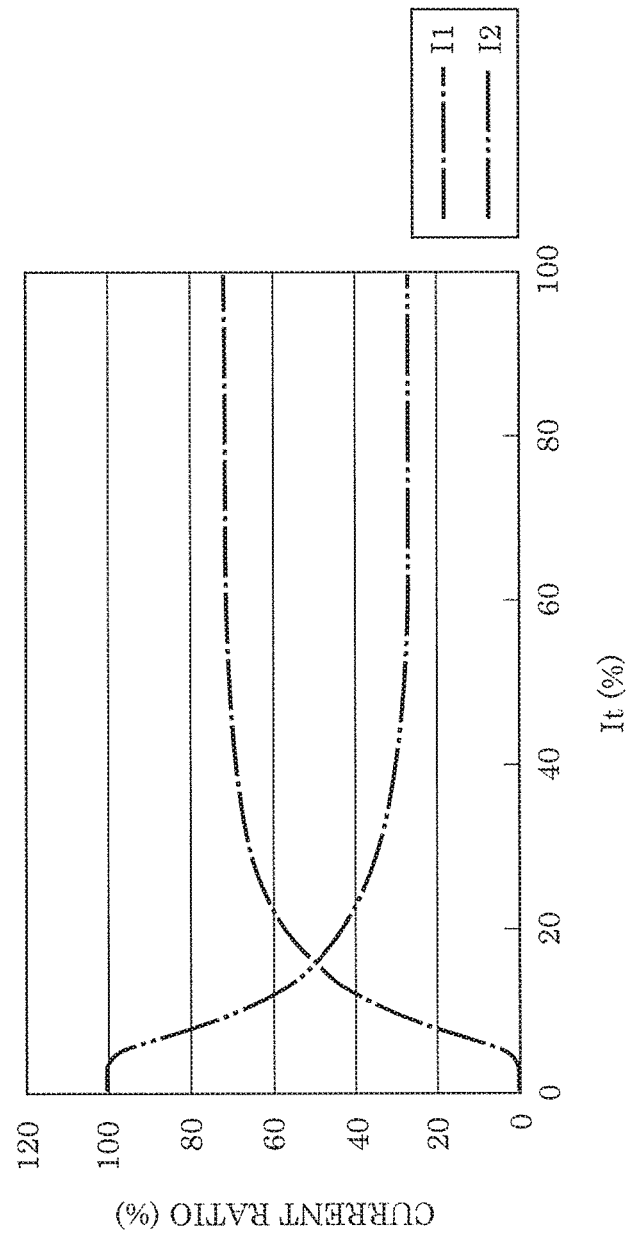
FIG. 2 is a graph illustrating an example of the magnitude of currents flowing through two light-emitting element columns of the luminaire in the comparative example.

FIG. 2 is a graph illustrating an example of the magnitude of currents flowing through two light-emitting element columns in the luminaire (comparative example) disclosed in PTL 1. In FIG. 2, the vertical axis indicates the current ratio of the two currents, and the horizontal axis indicates the magnitude of current outputted from constant current supply 133. The horizontal axis indicates the percentages (%) when the maximum value is 100%.

As illustrated in FIG. 2, in the luminaire disclosed in PTL 1, as the magnitude of the constant current I1 from constant current supply 133 increases, the ratio of current I1 flowing through cool color LED column 121 increases and the ratio of current I2 flowing through warm color LED column 122 decreases.

Here, as can be seen from FIG. 2, in the luminaire disclosed in PTL 1, except at the start of output (0%) of constant current supply 133, both cool color LED column 121 and warm color LED column 122 are always turned ON. In the luminaire disclosed in PTL 1, even when it is desired to make the color of warm color LED column 122 clearer immediately after the luminaire is turned ON, cool color LED column 121 also turns ON, which results in color toning in which the cool color is slightly mixed-in with the warm color.

As such, there is a demand for further broadening of the color toning range.

Hereinafter, illumination systems and luminaires according to embodiments of the present disclosure are described in detail with reference to the drawings. It should be noted that each of the subsequently-described embodiments shows a specific example of the present disclosure. Therefore, numerical values, shapes, materials, structural components, the arrangement and connection of the structural components, etc. shown in the following embodiments are mere examples, and are not intended to limit the scope of the present disclosure. Furthermore, among the structural components in the following embodiments, components not recited in any one of the independent claims which indicate the broadest concepts of the present disclosure are described as arbitrary structural components.

Furthermore, the respective figures are schematic diagrams and are not necessarily precise illustrations. In addition, in the respective diagrams, identical structural components are given the same reference signs.

Embodiment 1

An illumination system and a luminaire including the illumination system in Embodiment 1 will be described using FIG. 3 to FIG. 7.

Figure 3:
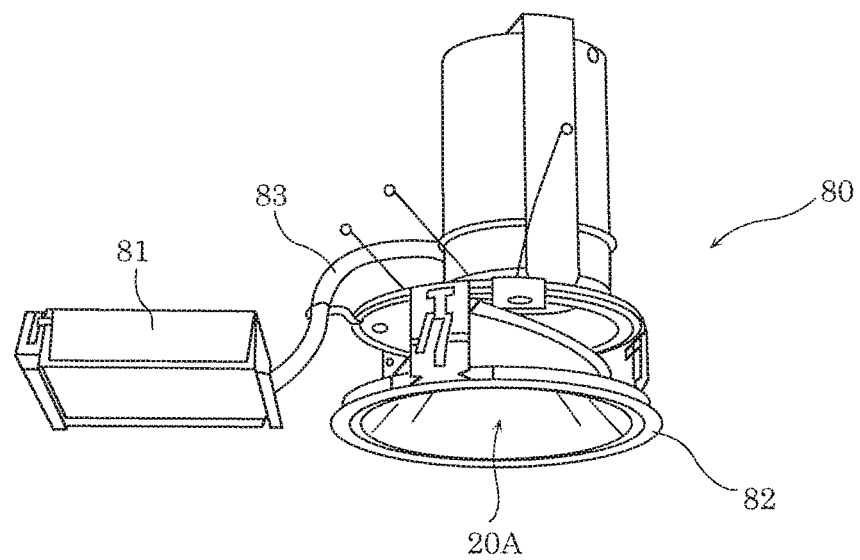
FIG. 3 is a perspective view of an example of the external appearance of a luminaire in Embodiment 1.

FIG. 3 is a perspective view of an example of the external appearance of the luminaire in this embodiment. Luminaire 80 illustrated in FIG. 3 is a downlight, and includes circuit box 81, lamp body 82, and wire 83. Circuit box 81 houses circuits (constant current supply, three-terminal regulator, current adjuster circuit, and current detector circuit (not illustrated)) included in luminaire 80. Lamp body 82 houses light source unit 20A. Wire 83 is a wire that connects the circuits and the light source unit included in luminaire 80.

[1-1. Luminaire Configuration]

Figure 4:
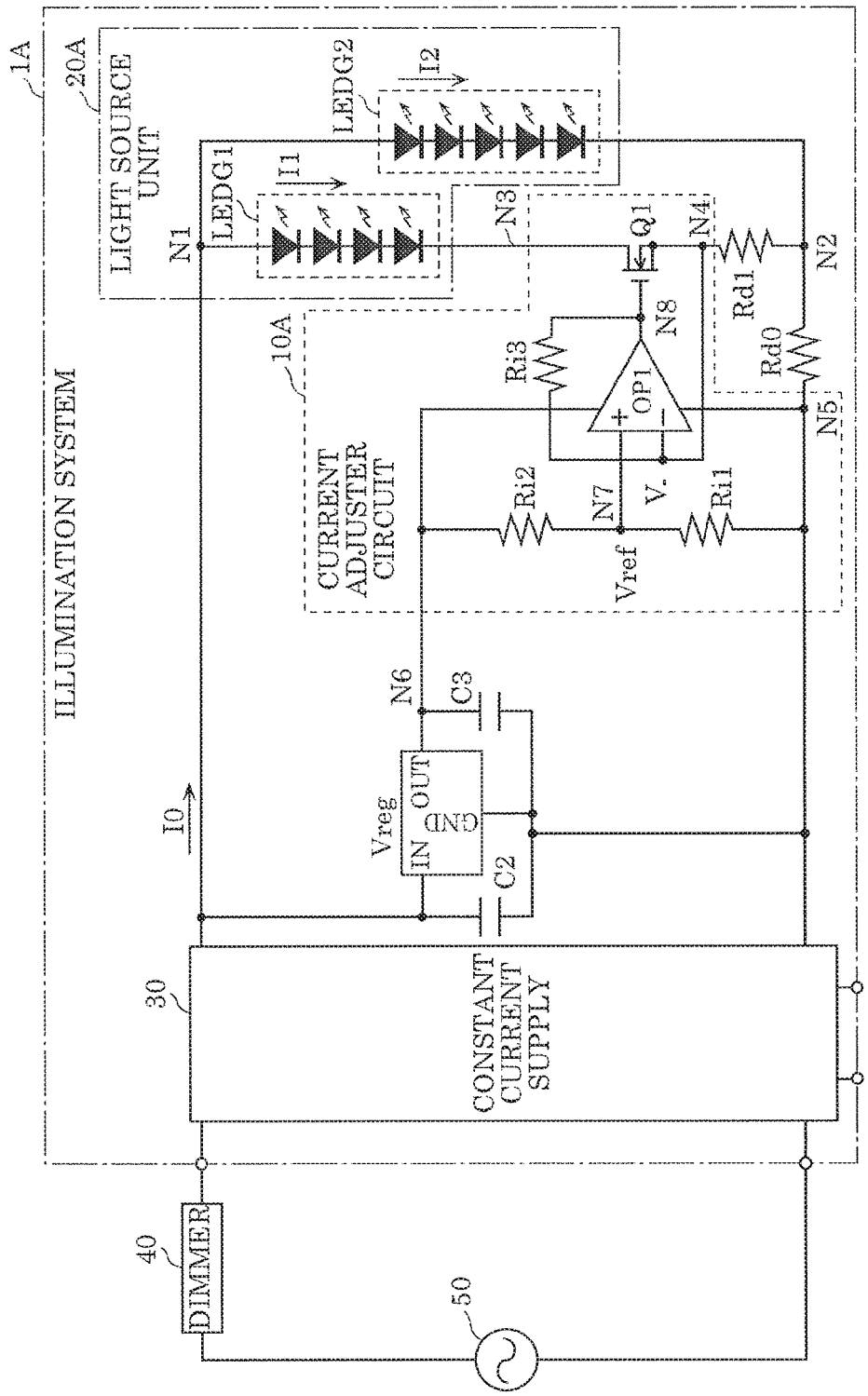
FIG. 4 is a circuit diagram illustrating an example of the circuit configuration of an illumination system in Embodiment 1.

FIG. 4 is a circuit diagram illustrating an example of the circuit configuration of luminaire 80 in this embodiment. Luminaire 80 is an appliance having a dimming function, and, as illustrated in FIG. 4, includes dimmer 40 and illumination system 1A, and power is supplied from alternating current (AC) power supply 50.

AC power supply 50 is, for example, an external commercial power supply.

Here, dimmer 40 is a phase-control dimmer, and adjusts the range of the phase (ON-phase) of the AC voltage to be inputted to constant current supply 30, according to a control signal from an illumination controller (not illustrated). The greater the range of the phase is, the greater the magnitude (amount) of constant current I0 outputted from constant current supply 30 becomes. The illumination controller enables operation to change the brightness of the luminaire in plural stages, and, when operated by a user, outputs a control signal indicating the brightness after the change (i.e., the new brightness) to dimmer 40. Dimmer 40 adjusts the aforementioned range of the phase according to the control signal. It should be noted that dimmer 40 may be a dimmer using another control method such as the pulse width modulation (PWM) control method, etc.

[1-1-1. Illumination System Configuration]

Illumination system 1A includes plural light sources (light-emitting element columns) of different color temperatures, and is a system for performing color toning of light to be outputted, according to a change in one parameter such as the magnitude of the constant current outputted from constant current supply 30. Illumination system 1A is configured to distribute the constant current to the light-emitting element columns, and performs color toning by adjusting the brightness of each light-emitting element column by changing the ratio of current that is passed to the respective light-emitting element columns.

As illustrated in FIG. 4, illumination system 1A includes constant current supply 30, light source unit 20A, three-terminal regulator Vreg, a first detector circuit (resistor Rd1), a constant current detector circuit (resistor Rd0), and current adjuster circuit 10A.

[Constant Current Supply]

Constant current supply 30 supplies constant current I0 to light source unit 20A, that is, first light-emitting element column LEDG1 and second light-emitting element column LEDG2 which are connected in parallel. As described above, dimmer 40 adjusts the range of the phase (ON-phase) of the AC voltage to be inputted to constant current supply 30, out of AC power supply 50. Although not illustrated in the figure, constant current supply 30 includes a voltage-raising or voltage-dropping circuit, a rectifier circuit, a smoothing circuit, etc., converts the inputted AC voltage into direct current (DC) voltage, and supplies, to light source unit 20A, constant current IO (DC current) of a magnitude corresponding to the DC current resulting from the conversion. Details of such a constant current supply 30 are well known by those of ordinary skill in the art, and are omitted herein for sake of brevity.

[Light Source Unit]

Here, light source unit 20A includes first light-emitting element column LEDG1 and second light-emitting element column LEDG2 which are connected in parallel.

First light-emitting element column LEDG1 includes four LEDs of the same type which are connected in series. Here, LEDs of "the same type" refers to LEDs having forward voltages of the same magnitude. The four LEDs are examples of first light-emitting elements. The four LEDs included in first light-emitting element column LEDG1 are what are called light bulb color LEDs having a color temperature of 2700 K. It should be noted that the forward voltages of all the LEDs included in first light-emitting element column LEDG1 are the same. It should be noted that, although it is sufficient that the four LEDs included in first light-emitting element column LEDG1 have the same color temperature, using what are referred to here as "the same type" of LEDs allows for reduction in cost.

In the subsequent description, the cathode terminal of the leading LED of first light-emitting element column LEDG1 in the direction in which current flows is referred to as the cathode terminal of first light-emitting element column LEDG1, and the anode terminal of the fourth LED in the direction in which current flows is referred to as the anode terminal of first light-emitting element column LEDG1. In first light-emitting element column LEDG1, the anode terminal and the cathode terminal are connected to node N1 and node N3, respectively. Furthermore, the current flowing through first light-emitting element column LEDG1 is referred to as current I1.

Second light-emitting element column LEDG2 includes five LEDs of the same type which are connected in series. Here, LEDs of "the same type" refers to LEDs having forward voltages of the same magnitude. The five LEDs are examples of second light-emitting elements. The five LEDs included in second light-emitting element column LEDG2 are what are called daylight white color LEDs having a color temperature of 5000 K. It should be noted that the forward voltages of all the LEDs included in second light-emitting element column LEDG2 are the same as the forward voltages of the LEDs included in first light-emitting element column LEDG1. It should be noted that, although it is sufficient that the five LEDs included in second light-emitting element column LEDG2 have the same color temperature, using what are referred to here as "the same type" of LEDs allows for reduction in cost.

In the subsequent description, the cathode terminal of the leading LED of second light-emitting element column LEDG2 in the direction in which current flows is referred to as the cathode terminal of second light-emitting element column LEDG2, and the anode terminal of the fifth LED in the direction in which current flows is referred to as the anode terminal of second light-emitting element column LEDG2. In second light-emitting element column LEDG2, the anode terminal and the cathode terminal are connected to node N1 and node N2, respectively. Furthermore, the current flowing through second light-emitting element column LEDG2 is referred to as current I2.

In this embodiment, the number of LEDs of first light-emitting element column LEDG1 is less than the number of LEDs of second light-emitting element column LEDG2. In other words, the sum of the forward voltages of the one or more LEDs belonging to second light-emitting element column LEDG2 is greater than the sum of the forward voltages of the one or more LEDs belonging to first light-emitting element column LEDG1. As such, when the voltage difference between node N1 and node N2 is greater than the sum of the forward voltages of first light-emitting element column LEDG1 and less than the sum of the forward voltages of second light-emitting element column LEDG2, current flows through first light-emitting element column LEDG1 but current does not flow through second light-emitting element column LEDG2. In other words, in this embodiment, dimming to turn ON first light-emitting element column LEDG1 and turn OFF second light-emitting element column LEDG2 becomes possible.

Figure 5:
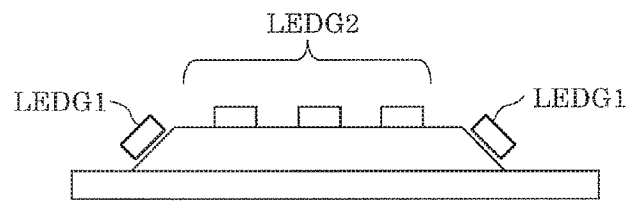
FIG. 5 is a diagram illustrating an example of the configuration of light sources in Embodiment 1.

FIG. 5 is a cross-sectional view of an example of the arrangement of first light-emitting element column LEDG1 and second light-emitting element column LEDG2 in this embodiment. First light-emitting element column LEDG1 and second light-emitting element column LEDG2 are arranged on a base which is shaped like a circular truncated cone. The four LEDs included in first light-emitting element column LEDG1 are dispersed on the sloped face of the base (two of the LEDs are illustrated in FIG. 5). The five LEDs included in second light-emitting element column LEDG2 are dispersed on the top face of the base (three of the LEDs are illustrated in FIG. 5). In this manner, the light distribution characteristics of first light-emitting element column LEDG1 and second light-emitting element column LEDG2 can be made different by adjusting the angles and positions of first light-emitting element column LEDG1 and second light-emitting element column LEDG2.

[Three-Terminal Regulator]

Three-terminal regulator Vreg is a conventional circuit that generates a constant output voltage, and has input terminal IN connected to node N1 and output terminal OUT connected to node N6. Capacitor C2 is connected between input terminal IN and grounding terminal GND. Capacitor C3 is connected between output terminal OUT and grounding terminal GND.

[First Detector Circuit]

The first detector circuit is a circuit that detects the magnitude of current I1 flowing through first light-emitting element column LEDG1. The first detector circuit is connected in series to first light-emitting element column LEDG1. More specifically, in this embodiment, the first detector circuit is resistor Rd1 having one end connected to node N4 and the other end connected to node N2.

Node N4 is a node to which the source terminal of transistor Q1 included in current adjuster circuit 10A, and the minus-side input terminal of operational amplifier (op amp) OP1 included in current adjuster circuit 10A are connected.

In other words, a voltage obtained by adding a voltage equivalent to the voltage drop in resistor Rd1 to the voltage of node N2 is inputted to the minus-side input terminal of op amp OP1. Where the resistance of resistor Rd1 is denoted as R1, the voltage equivalent to the voltage drop in resistor Rd1 can be represented as R1×I1, and thus the voltage inputted to the minus-side input terminal of op amp OP1 is a voltage that is dependent on the magnitude of current I1 flowing through first light-emitting element column LEDG1. By connecting resistor Rd1 in series with first light-emitting element column LEDG1, the magnitude of current I1 can be detected.

[Constant Current Detector Circuit]

The constant current detector circuit is a circuit that detects the magnitude of constant current I0. In this embodiment, the constant current detector circuit is resistor Rd0 having one end connected to node N2 and the other end connected to the low voltage-side terminal (node N5) of constant current supply 30.

Where the resistance of resistor Rd0 is denoted as R0, the voltage of node N2 is a voltage obtained by adding a voltage (R0×I0) equivalent to the voltage drop in resistor Rd0 to the voltage of the low voltage-side terminal (node N5) of constant current supply 30. In this embodiment, a voltage obtained by adding a voltage equivalent to the voltage drop in resistor Rd0 and a voltage equivalent to the voltage drop in resistor Rd1, which is the first detector circuit, is inputted to the minus-side input terminal of op amp OP1. By providing resistor Rd0, constant current I0 can be detected.

[Current Adjuster Circuit]

Current adjuster circuit 10A is a circuit that adjusts the magnitude of the current flowing through first light-emitting element column LEDG1, according to the magnitude of the current detected by the first detector circuit. More specifically, current adjuster circuit 10A compares the magnitude of the current detected by the first detector circuit with a reference value, and changes the magnitude of the current flowing through first light-emitting element column LEDG1 according to the result of the comparison. It should be noted that current adjuster circuit 10A in this embodiment adjusts the magnitude of the current flowing through first light-emitting element column LEDG1, according to the magnitude of the constant current detected by the constant current detector circuit, in addition to the magnitude of the current flowing through first light-emitting element column LEDG1.

As illustrated in FIG. 4, current adjuster circuit 10A includes a voltage divider circuit, transistor Q1, and a comparator amplifier circuit.

The voltage divider circuit is a circuit that generates reference voltage Vref from a constant voltage outputted from three-terminal regulator Vreg, and outputs a voltage obtained from dividing the constant voltage to the plus-side input terminal of op amp OP1. The voltage divider circuit is configured of the series circuit of resistors Ri1 and Ri2, with node N7, which is the connecting node of resistors Ri1 and Ri2, serving as an output node. Resistor Ri1 has one end connected to node N5 and the other end connected to node N7. Resistor Ri2 has one end connected to node N6 (node to which output terminal OUT of three-terminal regulator Vreg is connected) and the other end connected to node N7.

Where the resistance of resistor Ri1 is denoted as R11 and the resistance of resistor Ri2 is denoted as R12, reference voltage Vref is a voltage calculated by: (output voltage of three-terminal regulator Vreg)×R11/(R11+R12).

Transistor Q1 is a transistor that adjusts the current flowing through first light-emitting element column LEDG1. Transistor Q1 is a metal-oxide-semiconductor field-effect transistor (MOSFET), and has a gate terminal connected to the output terminal (node N8) of the comparator amplifier circuit, a drain terminal connected to the cathode terminal (node N3) of first light-emitting element column LEDG1, and a source terminal connected to the minus-side input terminal of op amp OP1 and the one end (node N4) of resistor Rd1. In other words, first light-emitting element column LEDG1, the drain terminal and source terminal of transistor Q1, and resistor Rd1, which is the first detector circuit, are connected in series between node N1 and node N2.

The comparator amplifier circuit compares the voltage drops in resistor Rd1 and resistor Rd0 with the reference value, and applies a voltage that is in accordance with the result of the comparison to the control terminal (i.e., gate terminal) of transistor Q1. Here, the comparator amplifier circuit is op amp OP1 having the plus-side input terminal connected to the output node (node N7) of the voltage divider circuit, the minus-side input terminal connected to node N4 which is the output node of the first detector circuit, and an output terminal connected to the gate terminal of transistor Q1. Resistor Ri3 is connected between the minus-side input terminal and the output terminal of op amp OP1.

A voltage obtained by adding the voltage drop (R0×I0) in resistor Rd0 and the voltage drop (R1×I1) in resistor Rd1 to the grounding voltage of constant current supply 30 is inputted to the minus-side input terminal of op amp OP1. Op amp OP1 compares the voltage drop (R1×I1) in resistor Rd1 and the voltage drop (R0×I0) in resistor Rd0, with reference voltage Vref (i.e., the reference value). When the voltage inputted to the minus-side input terminal of op amp OP1 is less than reference voltage Vref, op amp OP1 outputs a high-level (H-level) signal of a magnitude that is in accordance with the difference between the voltage inputted to the minus-side input terminal and reference voltage Vref. Op amp OP1 outputs a low-level (L-level) signal when the voltage inputted to the minus-side input terminal is greater than reference voltage Vref.

[1-2. Operation]

Figure 6:
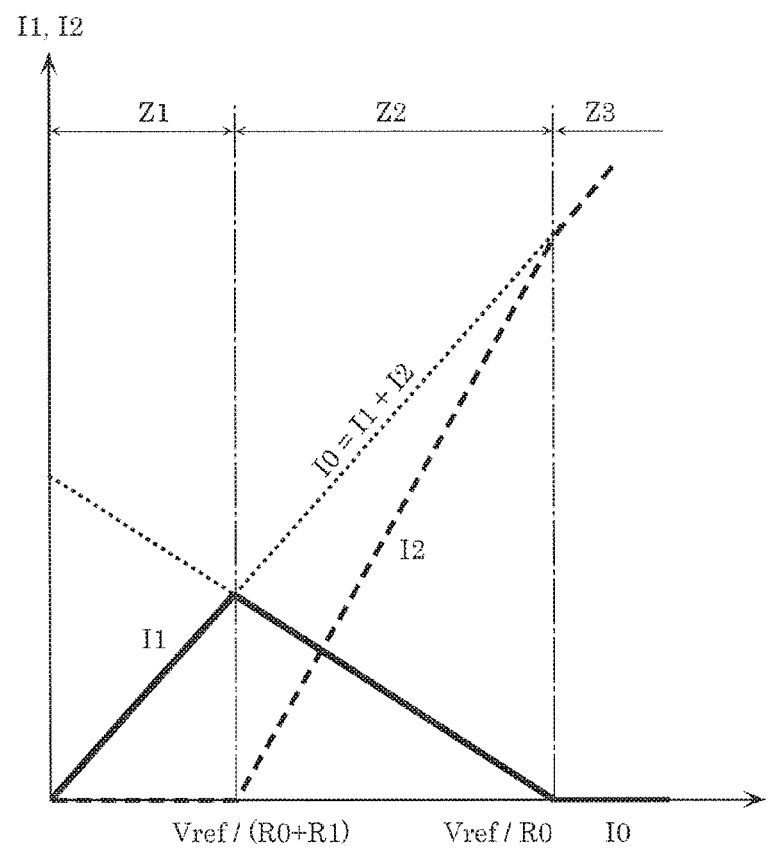
FIG. 6 is a graph illustrating an example of the relationship (dimming pattern) between respective currents flowing through a first light-emitting element column and a second light-emitting element column, and a constant current, in Embodiment 1.

The operation of current adjuster circuit 10A will be described using FIG. 6. FIG. 6 is a graph illustrating an example of the relationship between current I1 flowing through first light-emitting element column LEDG1 and current I2 flowing through second light-emitting element column LEDG2, and the constant current I0, in this embodiment. In FIG. 6, the horizontal axis indicates the magnitude of constant current I0, and the vertical axis indicates the magnitude of currents I1 and I2.

In FIG. 6, the graph includes range Z1 in which current I2 is 0, range Z2 in which both current I1 and current I2 are greater than 0, and range Z3 in which current I1 is 0.

(1) Range Z1

Range Z1 is a range in which the magnitude of constant current I0 is less than or equal to a first threshold value. In range Z1, first light-emitting element column LEDG1 is turned ON and second light-emitting element column LEDG2 is turned OFF.

At this time, since the relationship Vref≥(R0+R1)×I0 is satisfied, the first threshold value is represented by Vref/(R0+R1). In range Z1, current adjuster circuit 10A changes the magnitude of current I1 flowing through first light-emitting element column LEDG1 so that current I2 flowing through second light-emitting element column LEDG2 becomes 0.

In range Z1, voltage V− of the minus-side input terminal of op amp OP1 is sufficiently less than Vref, and thus the output voltage of op amp OP1 is fixed at what is called the H-level. With this, transistor Q1 operates in a linear region (i.e., what is called the drain-source resistance becomes extremely small).

Stated differently, range Z1 is a range in which the sum of the forward voltages of second light-emitting element column LEDG2 is greater than the voltage obtained by adding the voltage drop in resistor Rd1 to the sum of the forward voltages of the first light-emitting element column LEDG1, and current I2 of second light-emitting element column LEDG2 is 0.

(2) Range Z2

Range Z2 is a range in which the magnitude of constant current I0 is greater than the first threshold value and less than a second threshold value. It should be noted that the second threshold value is greater than the first threshold value. In range Z2, both first light-emitting element column LEDG1 and second light-emitting element column LEDG2 are turned ON.

At this time, since the relationship (R0+R1)×I0>Vref>R0×I0 is satisfied, the second threshold value is represented by Vref/R0. In range Z2, current adjuster circuit 10A adjusts the magnitude of the current flowing through first light-emitting element column LEDG1 so that current I1 becomes smaller and current I2 becomes bigger as constant current I0 becomes bigger.

In range Z2, the difference between voltage V− of the minus-side input terminal and voltage Vref of the plus-side input terminal of op amp OP1 becomes relatively small, and thus the output voltage of op amp OP1 becomes small. As such, transistor Q1 operates in a saturation region (i.e., operates as what is called a variable resistance element).

Specifically, when reference voltage Vref is greater than voltage V−, the output voltage of op amp OP1 becomes larger as the difference between reference voltage Vref and voltage V− is bigger. Here, voltage V− is represented by R1×I1+R0×I0.

The smaller current I1 is, the smaller the voltage drops in resistors Rd0 and Rd1 become, and the bigger the difference between reference voltage Vref and voltage V− becomes. Consequently, the output voltage of op amp OP1, that is, the voltage of the gate terminal of transistor Q1 becomes larger. When the voltage of the gate terminal of transistor Q1 becomes larger, the resistance of transistor Q1 becomes smaller, and current I1 becomes bigger.

The bigger current I1 is, the bigger the voltage drops in resistors Rd0 and Rd1 become, and the smaller the difference between reference voltage Vref and voltage V− becomes. Consequently, the output voltage of op amp OP1, that is, the voltage of the gate terminal of transistor Q1 becomes smaller. When the voltage of the gate terminal of transistor Q1 becomes smaller, the resistance of transistor Q1 becomes bigger, and current I1 becomes smaller.

In other words, in range Z2, current adjuster circuit 10A adjusts the gate voltage of transistor Q1 so that voltage V− becomes equal to reference voltage Vref. Stated differently, current adjuster circuit 10A adjusts the gate voltage of transistor Q1 so that current I1 flowing through first light-emitting element column LEDG1 becomes the value shown in Equation 1 below.

$$I1=(Vref-R0\times I0)/R1 \quad \text{(Equation 1)}$$

(3) Range Z3

Range Z3 is a range in which the magnitude of constant current I0 is greater than or equal to the first threshold value. In range Z3, first light-emitting element column LEDG1 is turned OFF and second light-emitting element column LEDG2 is turned ON.

At this time, since the relationship R0×I0≥Vref is satisfied, the second threshold value is represented as Vref/R0. In range Z3, current adjuster circuit 10A sets the magnitude of the current flowing through first light-emitting element column LEDG1 to 0.

In range Z3, the voltage drop in resistor Rd0, which is the constant current detector circuit, becomes greater than or equal to reference voltage Vref. At this time, in op amp OP1, the voltage (reference voltage Vref of the plus-side input terminal becomes less than voltage V− of the minus-side input terminal, and thus the output voltage of op amp OP1 is fixed to the L-level. As such, transistor Q1 is turned OFF, and current I1 of first light-emitting element column LEDG1 becomes 0.

Figure 7:
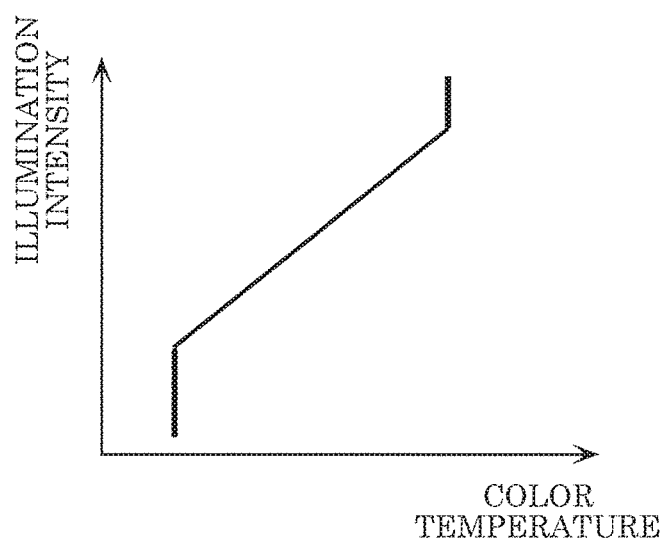
FIG. 7 is a graph illustrating the relationship between color temperature and illumination intensity of the illumination system in Embodiment 1.

FIG. 7 is a graph illustrating the relationship between color temperature and illumination intensity of illumination system 1A in this embodiment.

As illustrated in FIG. 7, in illumination system 1A in this embodiment, while illumination intensity is low, color temperature is low, and illumination is of a color approximating red. In illumination system 1A, as the illumination intensity increases, the color temperature rises, and illumination of a color approximating a cool color is obtained.

[1-3. Advantageous Effects, Etc.]

Illumination system 1A in this embodiment includes: a first detector circuit that is connected in series to first light-emitting element column LEDG1, and detects the magnitude of current I1 flowing through first light-emitting element column LEDG1; and current adjuster circuit 10A that adjusts the magnitude of the current flowing through first light-emitting element column LEDG1, according to the magnitude of the current detected by the first detector circuit.

With this, it is possible to create a state (range Z3) in which first light-emitting element column LEDG1 is turned OFF and second light-emitting element column LEDG2 is turned ON, and thus it is possible to broaden the color toning range.

In addition, in illumination system 1A, the sum of the forward voltages of second light-emitting element column LEDG2 is greater than the sum of the forward voltages of first light-emitting element column LEDG1, and thus it is possible to create a state in which first light-emitting element column LEDG1 is turned ON and second light-emitting element column LEDG2 is turned OFF. This allows the color toning range to be further broadened.

Stated differently, when the magnitude of constant current I0 is less than or equal to the first threshold value, current adjuster circuit 10A adjusts the magnitude of current I1 flowing through first light-emitting element column LEDG1 so that current I2 flowing through second light-emitting element column LEDG2 becomes 0. In addition, when the magnitude of constant current I0 is greater than or equal to the second threshold value, current adjuster circuit 10A sets the magnitude of current I1 flowing through first light-emitting element column LEDG1 to 0.

With this, it is possible to provide range Z1 in which only first light-emitting element column LEDG1 is turned ON, range Z2 in which both first light-emitting element column LEDG1 and second light-emitting element column LEDG2 are turned ON, and range Z3 in which only second light-emitting element column LEDG2 is turned ON. In other words, it is possible to create the states in range Z1 and range Z3 which do not exist in the comparative example, and the color toning range can be broadened further than in the comparative example.

Furthermore, in this embodiment, the color distribution characteristics of first light-emitting element column LEDG1 and the color distribution characteristics of second light-emitting element column LEDG2 are different. By adopting the arrangement illustrated in FIG. 5, first light-emitting element column LEDG1 can be used as indirect illumination, and second light-emitting element column LEDG2 can be used as direct illumination. More specifically, in illumination system 1A, in the case of low illumination intensity, first light-emitting element column LEDG1 can be turned ON to implement indirect illumination with light that is of a color approximating the warm color of first light-emitting element column LEDG1. Furthermore, in the case of high illumination intensity, second light-emitting element column LEDG2 can be turned ON to implement direct illumination with light that is of a color approximating the cool color of second light-emitting element column LEDG2. This allows the dramatic effect of the illumination system to be further enhanced.

In addition, illumination system 1A in this embodiment can implement color toning in which color temperature changes gradually as illustrated in FIG. 7, and is thus capable of implementing color toning that is more pleasant.

Embodiment 2

An illumination system and a luminaire including the illumination system in Embodiment 2 will be described using FIG. 8, FIG. 9, and FIG. 10A to FIG. 10C.

Whereas Embodiment 1 describes the case where reference voltage Vref is fixed, this embodiment describes the case where reference voltage Vref is changed according to constant current I0.

[2-1. Configuration]

Figure 8:
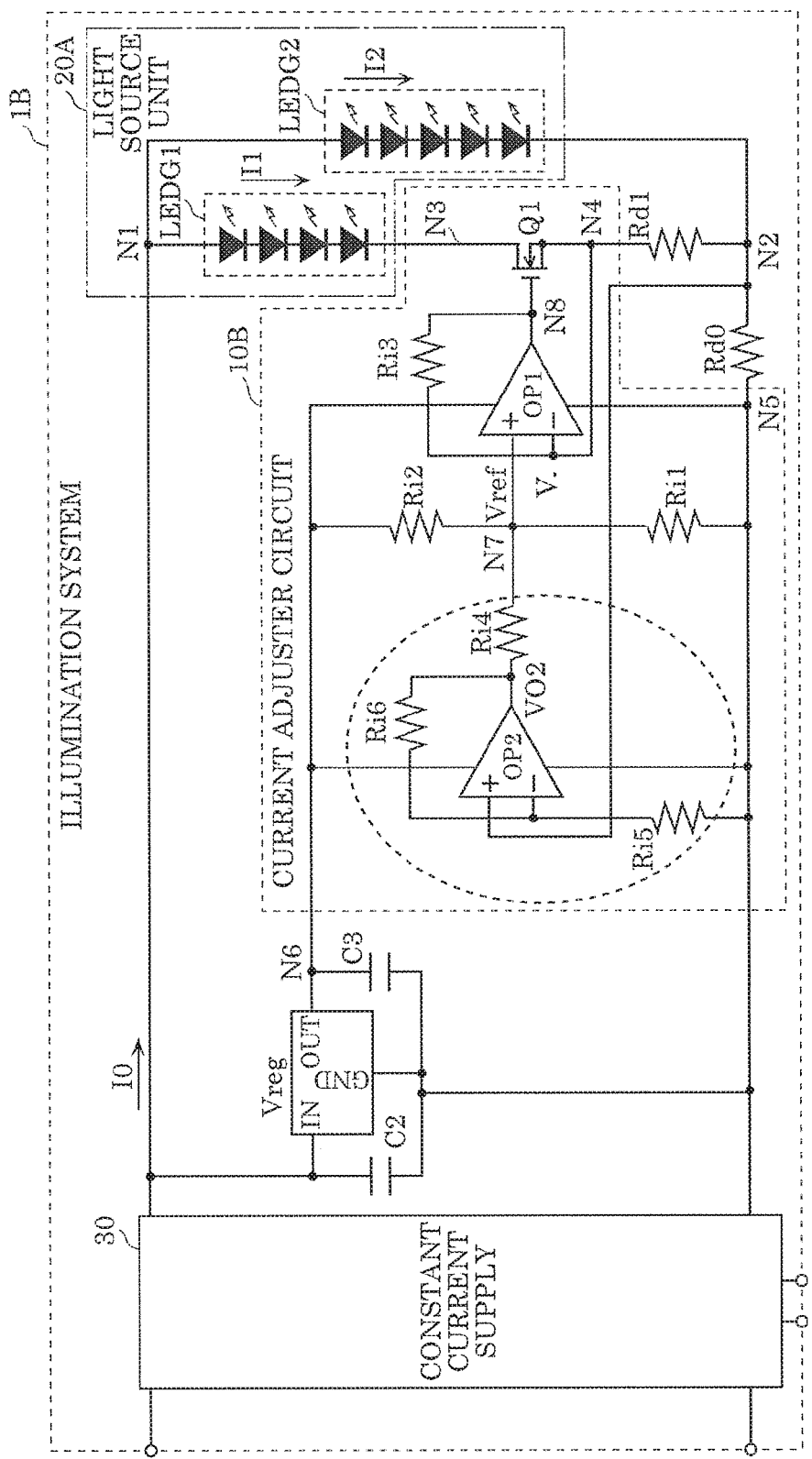
FIG. 8 is a circuit diagram illustrating an example of the circuit configuration of an illumination system in Embodiment 2.

FIG. 8 is a circuit diagram illustrating an example of the circuit configuration of illumination system 1B in this embodiment. In illumination system 1B illustrated in FIG. 8, part of current adjuster circuit 10B, that is, the portion surrounded by the oval, is different from current adjuster circuit 10A in Embodiment 1.

Current adjuster circuit 10B has a configuration in which op amp OP2 and resistors Ri4 to Ri6 are added to current adjuster circuit 10A in Embodiment 1.

Op amp OP2 is an example of a reference value adjuster circuit, and amplifies a voltage corresponding to constant current I0 detected by resistor Rd0, and applies the voltage to the plus-side input terminal of op amp OP1 via resistor Ri4. Operating amp OP2 has a plus-side input terminal connected to node N2, a minus-side input terminal connected to one end of resistor Ri5 and one end of resistor Ri6, and an output terminal connected to one end of resistor Ri4.

Resistor Ri4 has the one end connected to the output terminal of op amp OP2, and the other end connected to the plus-side input terminal of op amp OP1. Resistor Ri5 has the one end connected to the minus-side input terminal of op amp OP2 and one end of the resistor Ri6, and the other end connected to the grounding terminal (node N5) of constant current supply 30. Resistor Ri6 has the one end connected to the minus-side input terminal of op amp OP2, and the other end connected to the output terminal of op amp OP2.

It should be noted that although this embodiment describes the case where op amp OP2 is included in order to change reference voltage Vref according to constant current I0, the present disclosure is not limited to such a configuration. Instead of op amp OP2, another circuit having non-linear characteristics such as saturation characteristics, etc. may be provided.

[2-2. Operation]

Figure 9:
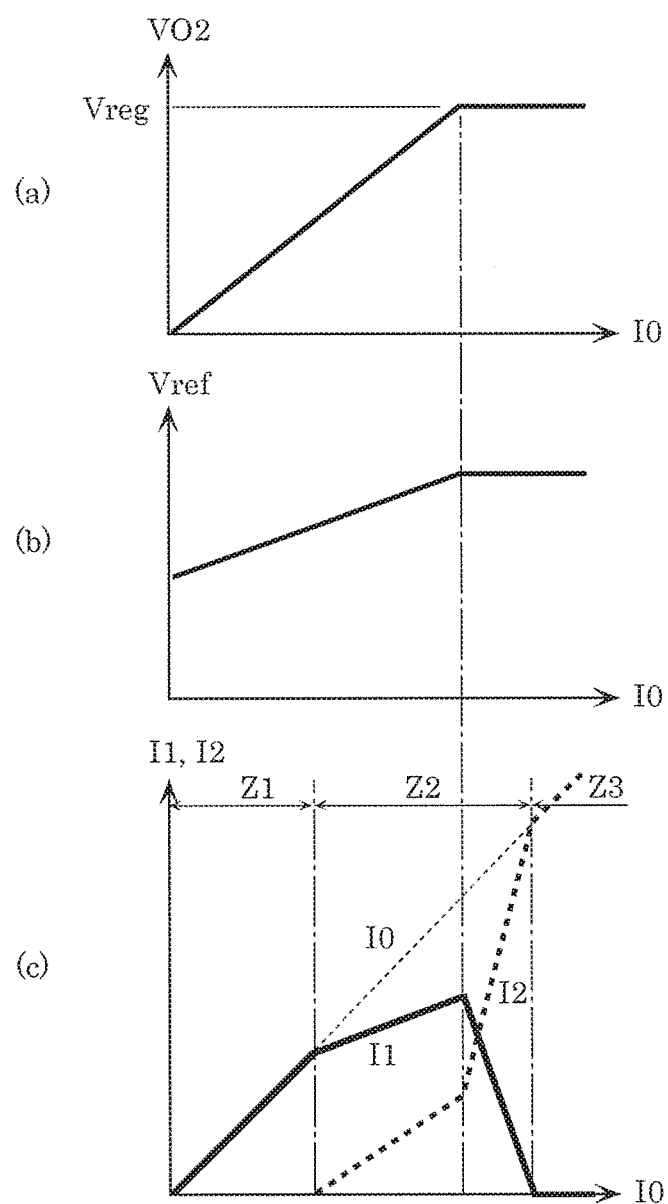
FIG. 9 illustrates graphs for describing the relationship between (a) the output of an operational amplifier which is a reference value adjuster circuit, (b) the reference voltage, and (c) an example of a dimming pattern, in Embodiment 2.

FIG. 9 illustrates graphs for describing the relationship between (a) the output of an operational amplifier which is a reference value adjuster circuit, (b) the reference voltage, and (c) an example of a dimming pattern, in this embodiment. In FIG. 9, (a) illustrates the relationship between the output voltage VO2 of op amp OP2 and constant current I0, and (b) illustrates the relationship between reference voltage Vref and constant current I0. In FIG. 9, (c) illustrates the relationship between currents I1 and I2 flowing through the first light-emitting element column and the second light-emitting element column, respectively, and the constant current I0.

In the graph of illumination system 1A in Embodiment 1 illustrated in FIG. 6, current I1 monotonically decreases and current I2 monotonically increases in range Z2.

In contrast, in the graph of illumination system 1B in this embodiment illustrated in FIG. 9, current I1 increases in the initial half of range Z2 and decreases in the latter half. Accordingly, the rate of increase of current I2 is higher in the latter half of range Z2 than in the initial half.

In other words, when the magnitude of constant current I0 is greater than or equal to a third threshold value which is greater than or equal to the first threshold value (i.e., the whole of range Z2 in Embodiment 1, and the latter half portion of range Z2 in this embodiment), current adjuster circuit 10B adjusts the magnitude of the current flowing through first light-emitting element column LEDG1 so that the magnitude of the current flowing through first light-emitting element column LEDG1 becomes smaller as constant current I0 becomes bigger.

Figure 10A:
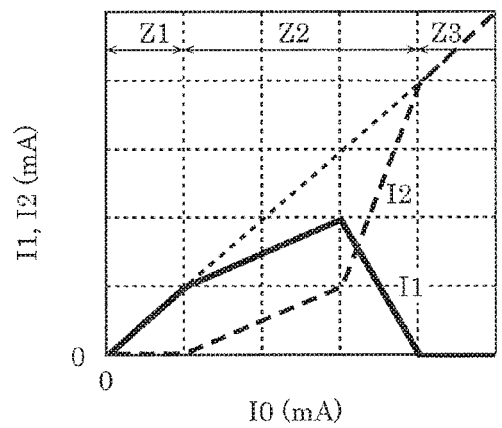
FIG. 10A is a graph illustrating an example of a dimming pattern in Embodiment 2.
Figure 10B:
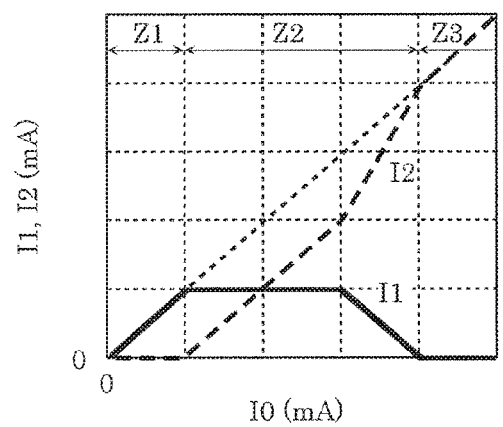
FIG. 10B is a graph illustrating another example of a dimming pattern in Embodiment 2.
Figure 10C:
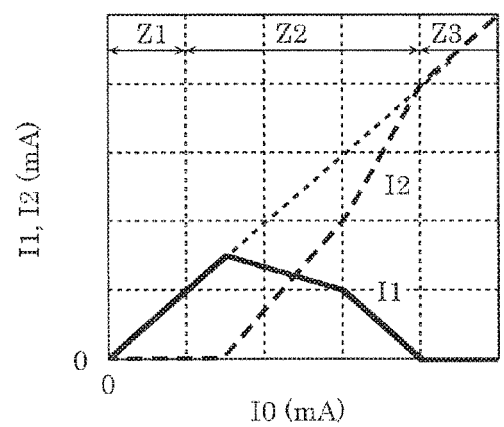
FIG. 10C is a graph illustrating another example of a dimming pattern in Embodiment 2.

FIG. 10A to FIG. 10C are graphs illustrating dimming patterns of respective light-emitting element columns for implementing a desired color toning curve (hereinafter referred to simply as "dimming pattern") By changing the magnitude of resistors Rd0, Rd1, and Ri1 to Ri6, three dimming patterns can be obtained. FIG. 10A is substantially the same as (c) in FIG. 9. FIG. 10B illustrates a dimming pattern in which current I1 is constant in the initial half of range Z2, and decreases in the latter half. FIG. 10C illustrates the case where current I1 decreases in range Z2, with the rate of decrease being higher in the latter half than in the initial half.

[2-3. Advantageous Effect]

In this embodiment, reference voltage Vref is changed according to constant current I0, and thus allowing variations to the dimming pattern. This further enhances the dramatic effect of the illumination system.

In addition, this embodiment also produces the same advantageous effects as Embodiment 1.

[2-4. Variations]

Figure 11:
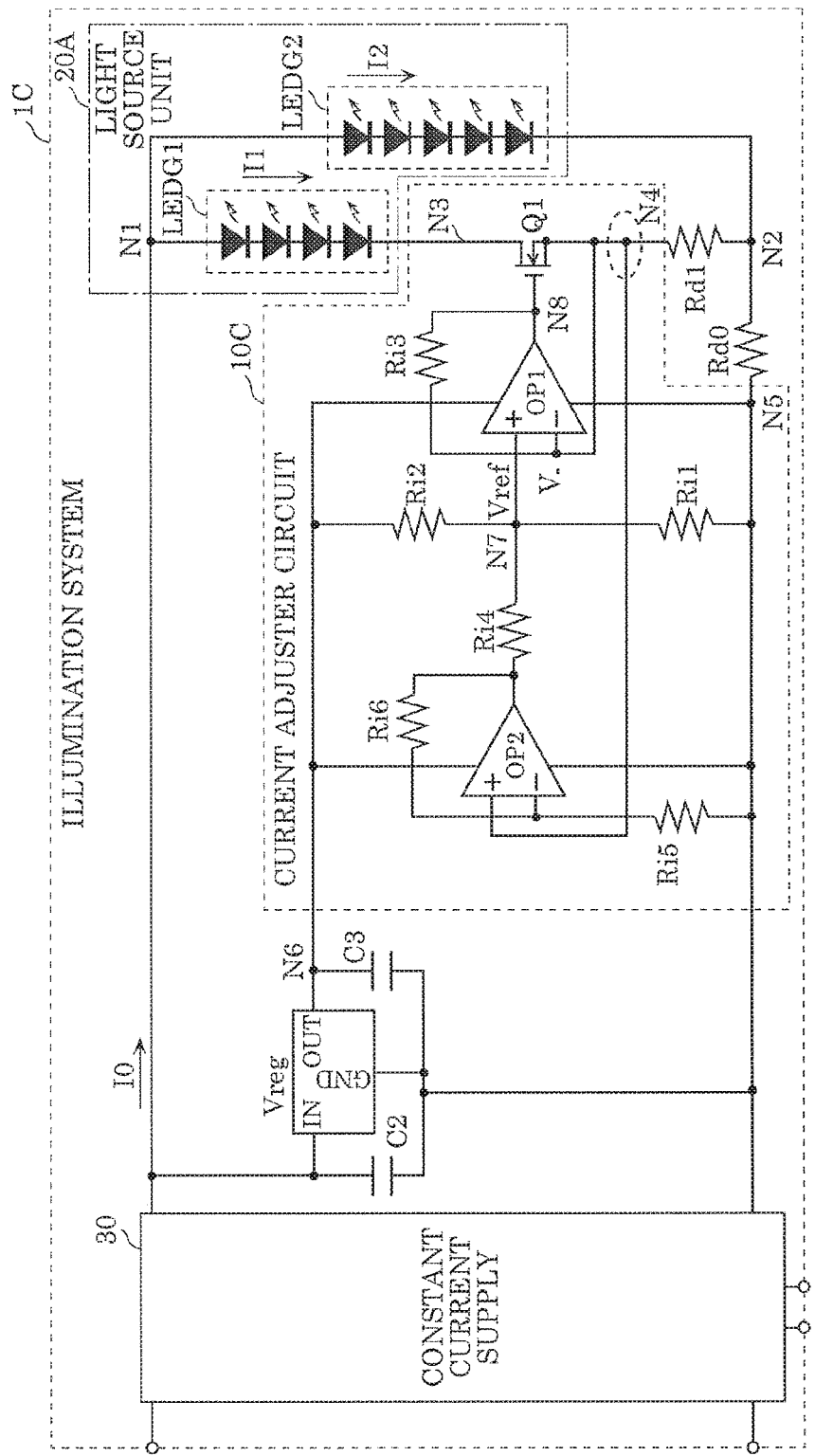
FIG. 11 is a circuit diagram illustrating an example of the circuit configuration of an illumination system in Variation 1 of Embodiment 2.

FIG. 11 is a circuit diagram illustrating an example of the circuit configuration of an illumination system in Variation 1 of Embodiment 2. Whereas the plus-side input terminal of op amp OP2 is connected to node N2 in Embodiment 2, the plus-side input terminal of op amp OP2 is connected to node N4 in current adjuster circuit 10C of illumination system 1C illustrated in FIG. 11.

Figure 12:
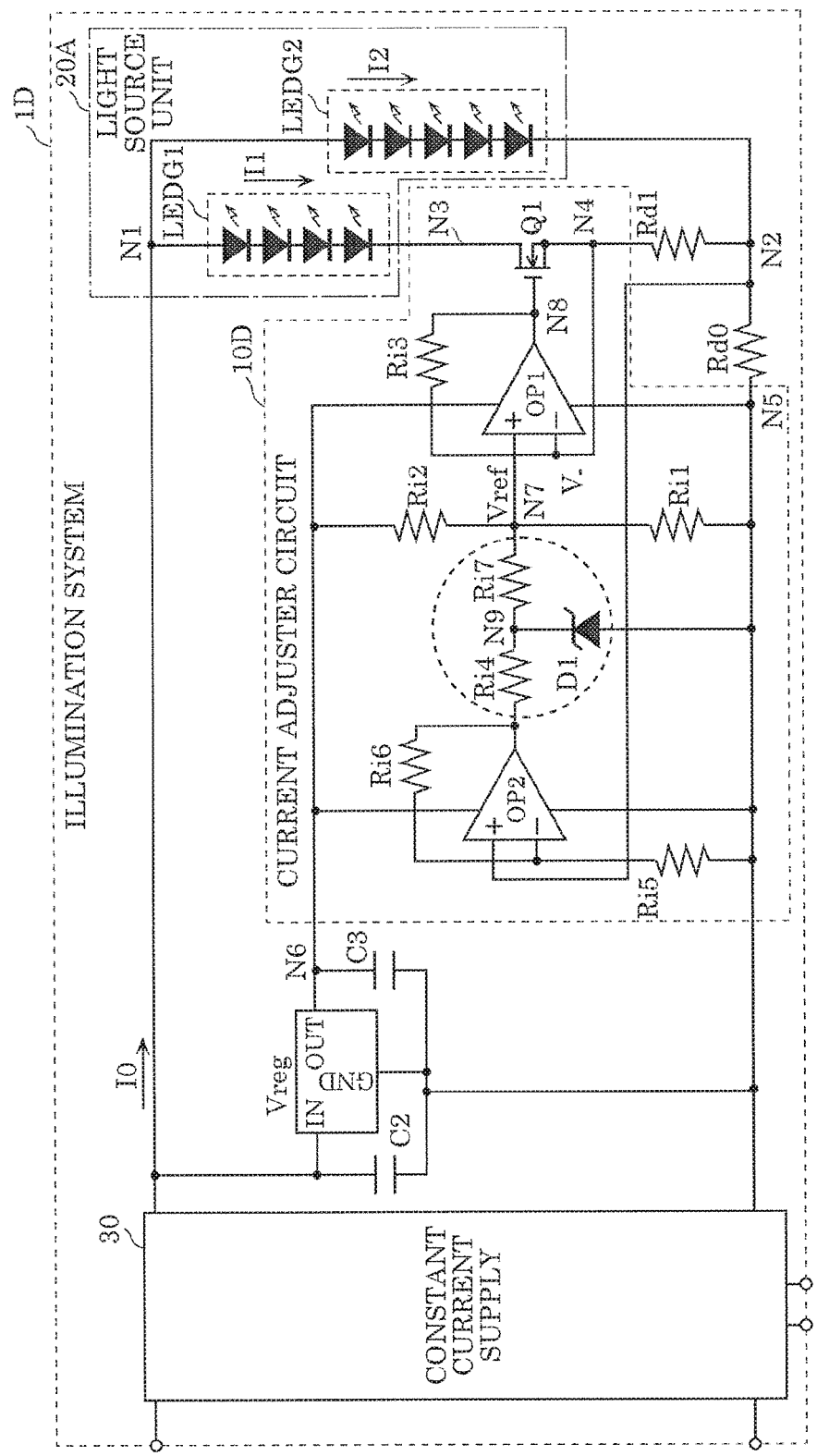
FIG. 12 is a circuit diagram illustrating an example of the circuit configuration of an illumination system in Variation 2 of Embodiment 2.

FIG. 12 is a circuit diagram illustrating an example of the circuit configuration of an illumination system in Variation 2 of Embodiment 2. In illumination system 1D illustrated in FIG. 12, in addition to the respective structural components in Embodiment 2, resistor Ri7 and Zener diode D1 are provided in current adjuster circuit 10D. Resistor Ri7 is connected between the other end of resistor Ri4 and node N7 (i.e., the plus-side input terminal of op amp OP1). Zener diode D1 has a cathode terminal connected to node N9 which is the connecting node between resistor Ri4 and resistor Ri7, and an anode terminal connected to node N5.

Either of Variation 1 or Variation 2 also allows flexible changing of the dimming pattern, which allows further enhancement of the dramatic effect of the illumination system.

Embodiment 3

An illumination system and a luminaire including the illumination system in Embodiment 3 will be described using FIG. 13, FIG. 14A, FIG. 14B, and FIG. 15.

Although the case where two light-emitting element columns is described in Embodiments 1 and 2, it is sufficient to have a number greater than or equal to two. In this embodiment, the case where three light-emitting element columns are included will be described.

[3-1. Illumination System Configuration]

The luminaire in this embodiment is a downlight including an illumination system that realizes a dimming function in the same manner as in Embodiment 1 illustrated in FIG. 3.

Figure 13:
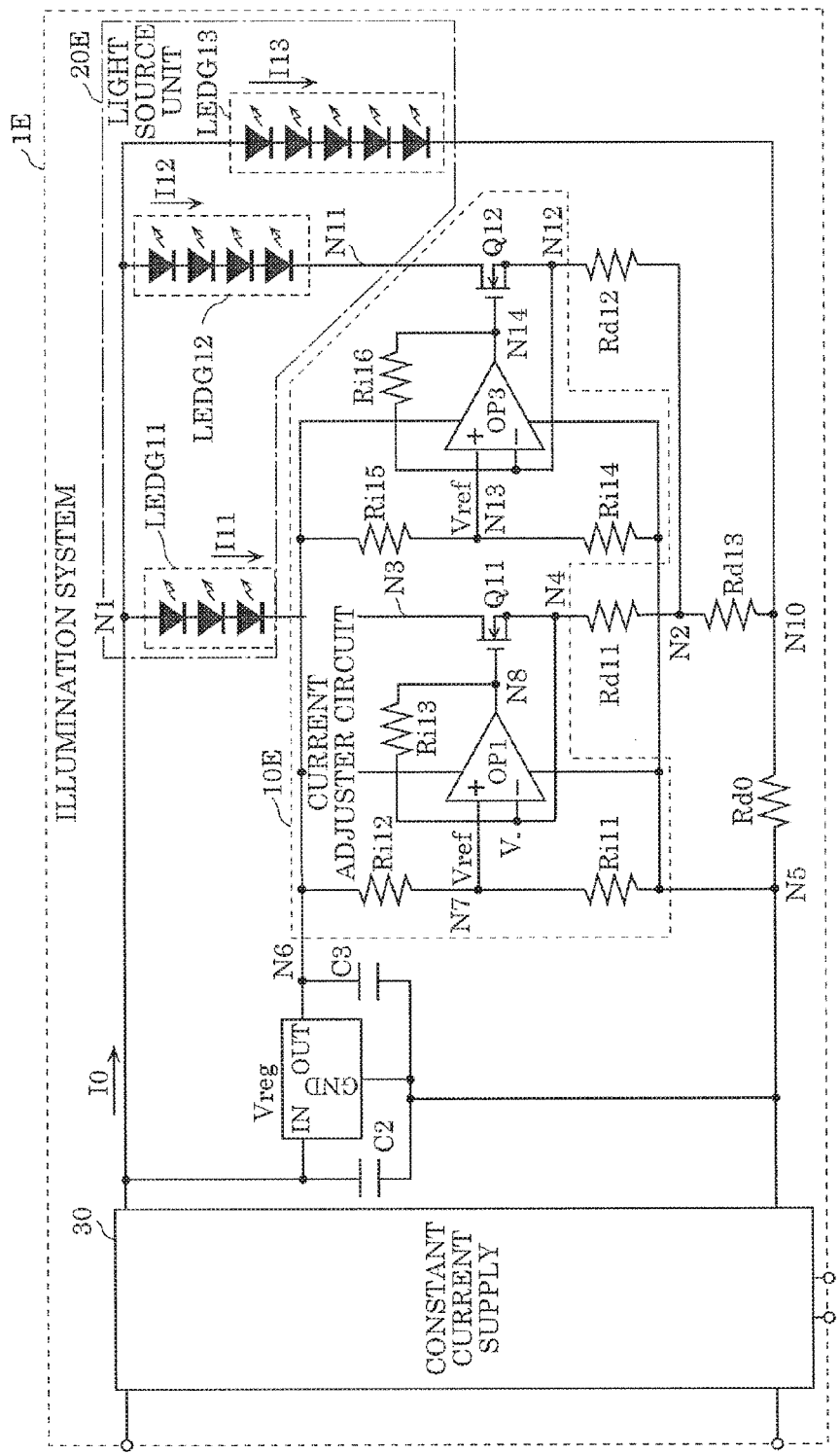
FIG. 13 is a circuit diagram illustrating an example of the circuit configuration of an illumination system in Embodiment 3.

FIG. 13 is a circuit diagram illustrating an example of the circuit configuration of an illumination system in this embodiment. As illustrated in FIG. 13, illumination system 1E includes constant current supply 30, light source unit 20E, three-terminal regulator Vreg, a first detector circuit, a second detector circuit, a third detector circuit, a constant current detector circuit, and current adjuster circuit 10E. The configurations of constant current supply 30 and three-terminal regulator Vreg are the same as in Embodiment 1.

[Light Source Unit]

Here, light source unit 20E includes the three light-emitting element columns, first light-emitting element column LEDG11, second light-emitting element column LEDG12, and third light-emitting element column LEDG13, which are connected in parallel.

First light-emitting element column LEDG11 includes three LEDs of the same type which are connected in series. Second light-emitting element column LEDG12 includes four LEDs of the same type which are connected in series. Third light-emitting element column LEDG13 includes five LEDs of the same type which are connected in series. It should be noted that LEDs of the same color temperature are included in a single light-emitting element column, whereas color temperatures are different among the light-emitting element columns.

In this embodiment, the following relationship is satisfied: the number of LEDs of first light-emitting element column LEDG11<the number of LEDs of second light-emitting element column LEDG12<the number of LEDs of third light-emitting element column LEDG13. Accordingly, the following relationship is satisfied: the sum of the forward voltages of first light-emitting element column LEDG11<the sum of the forward voltages of second light-emitting element column LEDG12<the sum of the forward voltages of third light-emitting element column LEDG13. Therefore, the timing at which current starts to flow to the three light-emitting element columns can be staggered.

The anode terminal of first light-emitting element column LEDG11, the anode terminal of second light-emitting element column LEDG12, and the anode terminal of third light-emitting element column LEDG13 are connected to node N1. The cathode terminal of first light-emitting element column LEDG11 is connected to node N3, the cathode terminal of second light-emitting element column LEDG12 is connected to node N11, and the cathode terminal of third light-emitting element column LEDG13 is connected to node N10.

Furthermore, the current flowing through first light-emitting element column LEDG11 is referred to as current I11, the current flowing through second light-emitting element column LEDG12 is referred to as current I12, and the current flowing through third light-emitting element column LEDG13 is referred to as current I13.

[First Detector Circuit]

The first detector circuit is resistor Rd11 which detects the magnitude of current I11 flowing through first light-emitting element column LEDG11, and has one end connected to node N4 (i.e., the cathode terminal of first light-emitting element column LEDG11 via transistor Q11), and the other end connected to node N2 (i.e., the connecting node on the cathode terminal side of first light-emitting element column LEDG11 and second light-emitting element column LEDG12).

[Second Detector Circuit]

The second detector circuit is resistor Rd12 which detects the magnitude of current I12 flowing through second light-emitting element column LEDG12, and has one end connected to node N12 (i.e., the cathode terminal of second light-emitting element column LEDG12 via transistor Q12), and the other end connected to N2.

[Third Detector Circuit]

The third detector circuit is resistor Rd13 which detects the magnitude of current I11 flowing through first light-emitting element column LEDG11 and the magnitude of second current I12 flowing through second light-emitting element column LEDG12, and has one end connected to node N2, and the other end connected to node N10 (i.e., the connecting node on the cathode terminal side of the three light-emitting element columns).

[Constant Current Detector Circuit]

The constant current detector circuit is resistor Rd0 which detects the magnitude of constant current I0, and has one end connected to node N10, and the other end connected to the low voltage-side terminal (node N5) of constant current supply 30.

It should be noted that, where the resistance of resistor Rd0 is denoted as R0, the resistance of resistor Rd11 is denoted as R1, the resistance of resistor Rd13 is denoted as R3, and the voltage of the low voltage-side terminal (node N5) of constant current supply 30 is the grounding voltage, the voltage of node N4 used for controlling first light-emitting element column LEDG11 is represented by: $R0 \times I0 + R3 \times (I11+I12) + R1 \times I11$.

Furthermore, where the resistance of resistor Rd12 is denoted as R2, the voltage of node N12 used for controlling second light-emitting element column LEDG12 is represented by: $R0 \times I0 + R3 \times (I11+I12) + R2 \times I12$.

[Current Adjuster Circuit]

Current adjuster circuit 10E is a circuit that adjusts the magnitude of the current flowing through first light-emitting element column LEDG11, according to the magnitude of the current detected by the first detector circuit, and adjusts the magnitude of the current flowing through second light-emitting element column LEDG12, according to the magnitude of the current detected by the second detector circuit.

It should be noted that, when the light source unit includes three or more stages of light-emitting element columns, it is sufficient to have light-emitting element column(s) to which a current adjuster circuit is provided and light-emitting element column(s) to which a current adjuster circuit is not provided. Here, a current adjuster circuit is provided to first light-emitting element column LEDG11 and second light-emitting element column LEDG12, and a current adjuster circuit is not provided to third light-emitting element column LEDG13.

As a first current adjuster circuit that adjusts the magnitude of current I11 flowing through first light-emitting element column LEDG11, current adjuster circuit 10E includes: a first voltage divider circuit including resistors Ri11 and Ri12; transistor Q11, and a first comparator amplifier circuit including op amp OP1 and resistor Ri13, as illustrated in FIG. 13. The configurations of the first voltage divider circuit, transistor Q1, and the first comparator amplifier circuit are the same as in current adjustor circuit 10A in Embodiment 1.

In addition, as a second current adjuster circuit that adjusts the magnitude of current I12 flowing through second light-emitting element column LEDG12, current adjuster circuit 10E includes: a second voltage divider circuit including resistors Ri14 and Ri15; transistor Q12, and a second comparator amplifier circuit including op amp OP3 and resistor Ri16, as illustrated in FIG. 13. The configuration of the second current adjuster circuit is basically the same as the configuration of the first current adjuster circuit.

Resistor Ri14 included in the second voltage divider circuit has one end connected to node N5, and the other end connected to node N13 which is the output node of the second voltage divider circuit. Resistor Ri15 has one end connected to node N13 and the other end connected to node N6 which is the output node of three-terminal regulator Vreg. Where the resistance of resistor Ri14 is denoted as R14 and the resistance of resistor Ri15 is denoted as R15, the output voltage of the second voltage divider circuit is a voltage calculated by: (output voltage of three-terminal regulator Vreg)×R14/(R14+R15). This becomes reference voltage Vref of the second current adjuster circuit. It should be noted that reference voltage Vref of the second current adjuster circuit may be different from reference voltage Vref of the first current adjuster circuit.

Transistor Q12 is a transistor that adjusts the current flowing through second light-emitting element column LEDG12. Transistor Q12 is a MOSFET, and has a gate terminal connected to the output terminal (node N14) of op amp OP3, a drain terminal connected to the cathode terminal (node N11) of second light-emitting element column LEDG12, and a source terminal connected to the minus-side input terminal of op amp OP3 and the one end (node N12) of resistor Rd12.

The second comparator amplifier circuit is a circuit that compares the total of the voltage drops in resistor Rd12, resistor Rd13, and resistor Rd0 with a reference value, and applies, to the control terminal of transistor Q12, a voltage which is in accordance with the result of the comparison. Here, the second comparator amplifier circuit is op amp OP3 having a plus-side input terminal connected to the output node (node N13) of the second voltage divider circuit, the minus-side input terminal connected to node N12, and an output terminal connected to the gate terminal of transistor Q12. Resistor Ri16 is connected between the minus-side input terminal and the output terminal of op amp OP3.

[3-2. Operation]

Figure 14A:
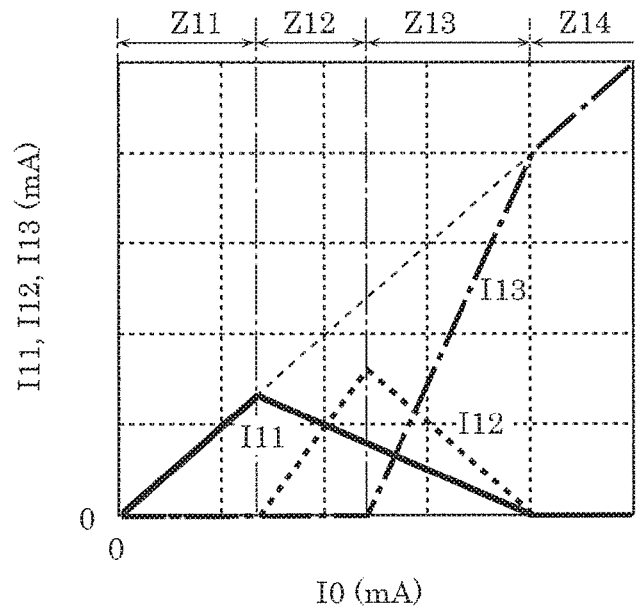
FIG. 14A is a graph illustrating an example of the relationship (dimming pattern) between respective currents flowing through a first light-emitting element column, a second light-emitting element column, and a third light-emitting element column, and a constant current, in Embodiment 3.
Figure 14B:
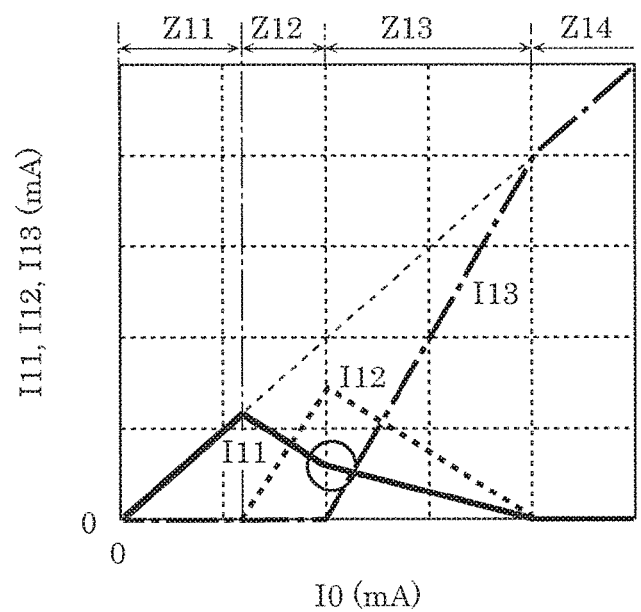
FIG. 14B is a graph illustrating an example of the relationship (dimming pattern) between the respective currents flowing through the first light-emitting element column, the second light-emitting element column, and the third light-emitting element column, and the constant current, in Embodiment 3.

The operation of current adjuster circuit 10E will be described using FIG. 14A and FIG. 14B. FIG. 14A and FIG. 14B are graphs illustrating examples of the relationship between current I11 flowing through first light-emitting element column LEDG11, current I12 flowing through second light-emitting element column LEDG12, and current I13 flowing through third light-emitting element column LEDG13, and the constant current I0, in this embodiment. It should be noted that FIG. 14A illustrates the case where the resistance of resistor Rd13 is 0 (i.e., the case where resistor Rd13 is not used).

In FIG. 14A and FIG. 14B, the graphs include range Z11 in which current I12 and current I13 are 0, range Z12 in which current I13 is 0, range Z13 in which currents I11 to I13 are greater than 0, and range Z14 in which current I11 and current I12 are 0.

For example, it is assumed that the color temperature of first light-emitting element column LEDG11 is 2700 K, the color temperature of third light-emitting element column LEDG13 is 5000 K, and the color temperature of second light-emitting element column LEDG12 is a color temperature halfway between the color temperature of first light-emitting element column LEDG11 and the color temperature of third light-emitting element column LEDG13.

In this case, in range Z11, red-colored indirect illumination of low illumination intensity is obtained. In range Z12, the illumination intensity of first light-emitting element column LEDG11 gradually decreases, and the illumination intensity of second light-emitting element column LEDG12 gradually increases. In range Z13, the illumination intensity of first light-emitting element column LEDG11 and second light-emitting element column LEDG12 gradually decrease, and become 0 at the start of range Z14. From the start of range Z13, the illumination intensity of third light-emitting element column LEDG13 gradually increases. In range Z14, third light-emitting element column LEDG13 is turned ON and the other light-emitting element columns are turned OFF.

It should be noted that, the slope of current I11 in ranges Z12 and Z13 is different between the case illustrated in FIG. 14A, in which resistor Rd13 is not provided, and the case illustrated in FIG. 14B in which resistor Rd13 is provided.

[3-3. Advantageous Effect]

In this embodiment, the case where three light-emitting element columns are included is described. In the case where three light-emitting element columns are included, it is also possible to realize range Z11 in which first light-emitting element column LEDG11 is turned ON and the other light-emitting element columns are turned OFF, and range Z14 in which third light-emitting element column LEDG13 is turned ON and the other light-emitting element columns are turned OFF, as illustrated in FIG. 14A and FIG. 14B, and thus it is possible to broaden the color toning range.

In addition, in this embodiment, illumination system 1E can implement color toning that gradually changes the color temperature as that illustrated in FIG. 14A and FIG. 14B, and thus it is also possible to implement more pleasant color toning.

Embodiment 4

[4-1. Luminaire Overall Configuration]

First, the configurations of lighting apparatus 2A and luminaire 80A using the same in Embodiment 4 will be described.

Figure 15:
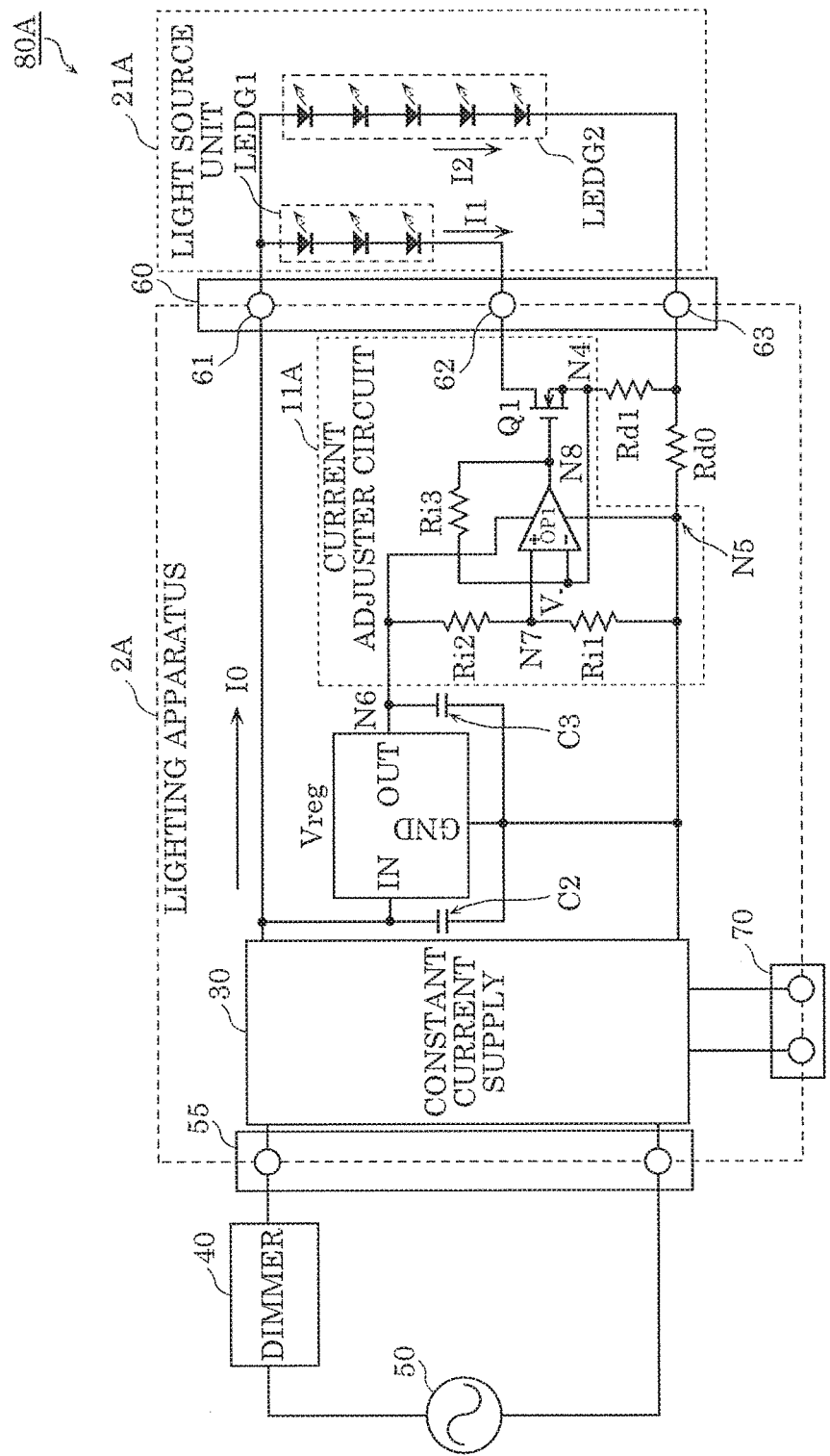
FIG. 15 is a circuit diagram illustrating the circuit configuration of the luminaire in Embodiment 1.

FIG. 15 is a circuit diagram illustrating the circuit configuration of luminaire 80A in Embodiment 4. It should be noted that FIG. 15 also illustrates AC power supply 50 which is an external power supply (for example, a 100 V/50 Hz AC commercial power supply) that generates the AC voltage inputted to lighting apparatus 2A.

As illustrated in FIG. 15, luminaire 80A is an appliance that emits illuminating light from light source unit 21A by receiving input of AC power from AC power supply 50, and includes lighting apparatus 2A, light source unit 21A, and dimmer 40. The respective structural components are described below.

[4-1-1. Dimmer]

Here, dimmer 40 is a phase-control dimmer, and adjusts the range of the phase (ON-phase) of the AC voltage to be inputted to constant current supply 30 of lighting apparatus 2A, according to a control signal from an illumination controller (not illustrated). The greater the range of the phase is, the greater the magnitude of constant current I0 outputted from constant current supply 30 becomes. The illumination controller enables operation to change the brightness of the luminaire in plural stages, and, when operated by a user, outputs a control signal indicating the brightness after the change (i.e., the new brightness) to dimmer 40. Dimmer 40 adjusts the aforementioned range of the phase according to the control signal. It should be noted that dimmer 40 may be a dimmer using another control method such as the PWM control method, etc. Furthermore, when the output current of constant current supply 30 can be controlled by a control signal from the outside, dimmer 40 need not be included.

[4-1-2. Light Source Unit]

Light source unit 21A is the illumination light releasing unit of luminaire 80A, and includes plural light-emitting element columns. In this embodiment, light source unit 21A includes first light-emitting column LEDG1 and second light-emitting element column LEDG2.

First light-emitting column LEDG1 is a light source in which one or more first light-emitting elements are connected in series. In this embodiment, a first light-emitting element is configured of an LED that outputs a warm color light having a color temperature of approximately 2700 K.

In the subsequent description, the anode terminal of the LED on the upper end of first light-emitting element column LEDG1 in FIG. 15 is referred to as the anode terminal of first light-emitting element column LEDG1, and the cathode terminal of the LED on the bottom end is referred to the cathode terminal of first light-emitting element column LEDG1. Furthermore, the current flowing through first light-emitting element column LEDG1 is referred to as first current I1.

Second light-emitting element column LEDG2 is a light source in which one or more second light-emitting elements are connected in series. In this embodiment, a second light-emitting element is configured of an LED that outputs a cool color light having a color temperature of approximately 5000 K.

In the subsequent description, the anode terminal of the LED on the upper end of second light-emitting element column LEDG2 in FIG. 15 is referred to as the anode terminal of second light-emitting element column LEDG2, and the cathode terminal of the LED on the bottom end is referred to the cathode terminal of second light-emitting element column LEDG2. Furthermore, the current flowing through second light-emitting element column LEDG2 is referred to as second current I2.

Furthermore, in this embodiment, the respective light-emitting element columns are configured in such a way that the sum of the forward voltages of the one or more second light-emitting elements belonging to second light-emitting element column LEDG2 is greater than the sum of the forward voltages of the one or more first light-emitting elements belonging to first light-emitting element column LEDG1. For example, when the forward voltages of the LEDs included in first light-emitting element column LEDG1 and the LEDs included in second light-emitting element column LEDG2 are approximately the same, the light-emitting element columns are configured so that second light-emitting element column LEDG2 has a greater number of LEDs connected in series than first light-emitting element column LEDG1.

[4-1-3. Lighting Apparatus]

Lighting apparatus 2A is an apparatus that supplies current to the plural light-emitting element columns of light source unit 21A. Lighting apparatus 2A includes power input terminal 55, current output terminal 60, constant current supply 30, control signal input terminal 70, current adjuster circuit 11A, a first detector circuit (resistor Rd1), and a constant current detector circuit (resistor Rd0).

[Power Input Terminal]

Power input terminal 55 is a terminal to which AC power is inputted from AC power supply 50 via dimmer 40.

[Current Output Terminal]

Current output terminal 60 is a terminal for supplying current to the plural light-emitting element columns of light source unit 21A, and includes common terminal 61, and plural branch terminals 61 and 63. In this embodiment, the plural branch terminals include first branch terminal 62 and second branch terminal 63. The anode terminals of first light-emitting element column LEDG1 and second light-emitting element column LEDG2 are connected to common terminal 61. Furthermore, the cathode terminal of first light-emitting element column LEDG1 is connected to first branch terminal 62. Furthermore, the cathode terminal of second light-emitting element column LEDG2 is connected to second branch terminal 63.

Moreover, in this embodiment, current output terminal 60 is configured to allow attachment and detachment of light source unit 21A. Accordingly, when light source 21A breaks down or when changing the color temperature of the illumination light, etc., it is possible to substitute only the light source unit 21A.

[Constant Current Supply]

Constant current supply 30 is a circuit to which power is inputted from AC power supply 50 via dimmer 40 and power input terminal 55, and which supplies direct current constant current I0 to light source unit 21A via current output terminal 60 and current adjuster circuit 11A. More specifically, constant current supply 30 supplies current to the each of the plural light-emitting element columns connected between common terminal 61 and the respective plural branch terminals so that the sum of currents flowing from common terminal 61 to the plural branch terminals (that is, constant current I0) is constant. Constant current supply 30 is a current supply that allows output current to be controlled from the outside, and is configured of, for example, a buck converter, an insulated flyback converter, etc. The magnitude of the output current of constant current supply 30 is controlled according to a PWM signal, a 0 to 10 V DC signal, etc., inputted to control signal input terminal 70. Furthermore, the magnitude of the output current of constant current supply 30 may be controlled using dimmer 40. As illustrated in FIG. 15, one of the output terminals of constant current supply 30 is connected to common terminal 61 of current output terminal 60 and to one of the input terminals of current adjuster circuit 11A via three-terminal regulator Vreg, and the other output terminal of constant current supply 30 is connected to the other of the input terminals of current adjuster circuit 11A.

[Control Signal Input Terminal]

Control signal input terminal 70 is a terminal for the input of a control signal to constant current supply 30, and receives, for example, a PWM signal, a DC signal, etc., as input. It should be noted that when the output current of constant current supply 30 is to be controlled using dimmer 40, control signal input terminal 70 need not be provided. Furthermore, the control signal to be inputted to constant current supply 30 may be inputted to constant current supply 30 as a wireless signal outputted from a remote controller, etc. Again, details regarding design and operation of such a constant current supply 30 are known in the art such that further detail is omitted herein for sake of brevity.

[Three-Terminal Regulator]

Three-terminal regulator Vreg is a circuit that generates a constant voltage, and has input terminal IN connected to node common terminal 61, and output terminal OUT connected to node N6 representing one of the input terminals to current adjuster circuit 11A. Capacitor C2 is connected between input terminal IN and grounding terminal GND. Capacitor C3 is connected between output terminal OUT and grounding terminal GND. Capacitors C2 and C3 are elements for oscillation prevention, and control the pulsation of the output voltage of three-terminal regulator Vreg. Although power is inputted to three-terminal regulator Vreg from constant current supply 30 in this embodiment, power from a power supply other than constant current supply 30 may be inputted to three-terminal regulator Vreg.

[First Detector Circuit]

The first detector circuit is a circuit that detects the magnitude of first current I1 flowing through first light-emitting element column LEDG1. The first detector circuit is connected in series to first light-emitting element column LEDG1. More specifically, in this embodiment, the first detector circuit is resistor Rd1 having one end connected to node N4, and the other end connected to second branch terminal 63.

Node N4 is a node to which the source terminal of transistor Q1 included in current adjuster circuit 11A, and the minus-side input terminal of op amp OP1 included in current adjuster circuit 11A are connected.

In other words, a voltage obtained by adding a voltage equivalent to the voltage drop in resistor Rd1 to the voltage of second branch terminal 63 is inputted to the minus-side input terminal of op amp OP1. Where the resistance of resistor Rd1 is denoted as R1, the voltage equivalent to the voltage drop in resistor Rd1 can be represented by R1×I1, and thus the voltage inputted to the minus-side input terminal of op amp OP1 is a voltage that is dependent on the magnitude of first current I1 flowing through first light-emitting element column LEDG1. By connecting resistor Rd1 in series with first light-emitting element column LEDG1, the magnitude of first current I1 can be detected.

[Constant Current Detector Circuit]

The constant current detector circuit is a circuit that detects the magnitude of constant current I0. In this embodiment, the constant current detector circuit is resistor Rd0 having one end connected to second branch terminal 63, and the other end connected to the low voltage-side terminal (node N5) of constant current supply 30.

Where the resistance of resistor Rd0 is denoted as R0, the voltage of second branch terminal 63 is a voltage obtained by adding a voltage (R0×I0) equivalent to the voltage drop in resistor Rd0 to the voltage of the low voltage-side terminal (node N5) of constant current supply 30. In this embodiment, a voltage obtained by adding a voltage equivalent to the voltage drop in resistor Rd0 and a voltage equivalent to the voltage drop in resistor Rd1, which is the first detector circuit, is inputted to the minus-side input terminal of op amp OP1. By providing resistor Rd0, constant current I0 can be detected.

[Current Adjuster Circuit]

Current adjuster circuit 11A is a circuit that adjusts the magnitude of the current flowing through at least one of the plural branch terminals from common terminal 61 of current output terminal 60. In this embodiment, current adjuster circuit 11A adjusts the magnitude of first current I1 flowing through first light-emitting element column LEDG1, based on the detected value of first current I1 detected by the first detector circuit. More specifically, current adjuster circuit 11A compares the magnitude of first current I1 detected by the first detector circuit with a reference value, and changes the magnitude of first current I1 flowing through first light-emitting element column LEDG1 according to the result of the comparison. It should be noted that current adjuster circuit 11A in this embodiment adjusts the magnitude of first current I1 flowing through first light-emitting element column LEDG1, according to the magnitude of constant current I0 detected by the constant current detector circuit, in addition to the magnitude of first current I1 flowing in first light-emitting element column LEDG1.

As illustrated in FIG. 15, current adjuster circuit 11A includes a voltage divider circuit, transistor Q1, and a comparator amplifier circuit.

The voltage divider circuit is a circuit that generates reference voltage Vref from a constant voltage outputted from three-terminal regulator Vreg, and outputs a voltage obtained from dividing the constant voltage to the plus-side input terminal of op amp OP1. The voltage divider circuit is configured of the series circuit of resistors Ri1 and Ri2, with node N7, which is the connecting node of resistors Ri1 and Ri2, serving as an output node. Resistor Ri1 has one end connected to node N5 and the other end connected to node N7. Resistor Ri2 has one end connected to node N6 (node to which output terminal OUT of three-terminal regulator Vreg is connected) and the other end connected to node N7.

Where the resistance of resistor Ri1 is denoted as R11 and the resistance of resistor Ri2 is denoted as R12, reference voltage Vref is a voltage calculated by: (output voltage of three-terminal regulator Vreg)×R11/(R11+R12).

Transistor Q1 is a transistor that adjusts the current flowing through first light-emitting element column LEDG1. Transistor Q1 is a MOSFET, and has a gate terminal connected to the output terminal (node N8) of the comparator amplifier circuit, a drain terminal connected to the cathode terminal (first branch terminal 62) of first light-emitting element column LEDG1, and a source terminal connected to the minus-side input terminal of op amp OP1 and the one end (node N4) of resistor Rd1. In other words, first light-emitting element column LEDG1, the drain terminal and source terminal of transistor Q1, and resistor Rd1, which is the first detector circuit, are connected in series between common terminal 61 and second branch terminal 63.

The comparator amplifier circuit is a circuit that compares the voltage drops in resistor Rd1 and resistor Rd0 with the reference value, and applies a voltage that is in accordance with the result of the comparison to the control terminal (i.e., gate terminal) of transistor Q1. Here, the comparator amplifier circuit is op amp OP1 having the plus-side input terminal connected to the output node (node N7) of the voltage divider circuit, the minus-side input terminal connected to node N4 which is the output node of the first detector circuit, and an output terminal connected to the gate terminal of transistor Q1. Resistor Ri3 is connected between the minus-side input terminal and the output terminal of op amp OP1.

A voltage obtained by adding the voltage (R0×I0) equivalent to the voltage drop in resistor Rd0 and the voltage (R1×I1) equivalent to the voltage drop in resistor Rd1 to the grounding voltage of constant current supply 30 is inputted to the minus-side input terminal of op amp OP1. Op amp OP1 compares the voltage (R1×I1) equivalent to the voltage drop in resistor Rd1 and the voltage (R0×I0) equivalent to the voltage drop in resistor Rd0 with reference voltage Vref (i.e., the reference value). When the voltage inputted to the minus-side input terminal of op amp OP1 is less than reference voltage Vref, op amp OP1 outputs a high-level (H-level) signal of a magnitude that is in accordance with the difference between the voltage inputted to the minus-side input terminal and reference voltage Vref. Op amp OP1 outputs a low-level (L-level) signal when the voltage inputted to the minus-side input terminal is greater than reference voltage Vref.

[4-2. Lighting Apparatus Operation]

Next, the operation of aforementioned lighting apparatus 2A, particularly the operation of current adjuster circuit 11A, will be described using FIG. 16.

Figure 16:
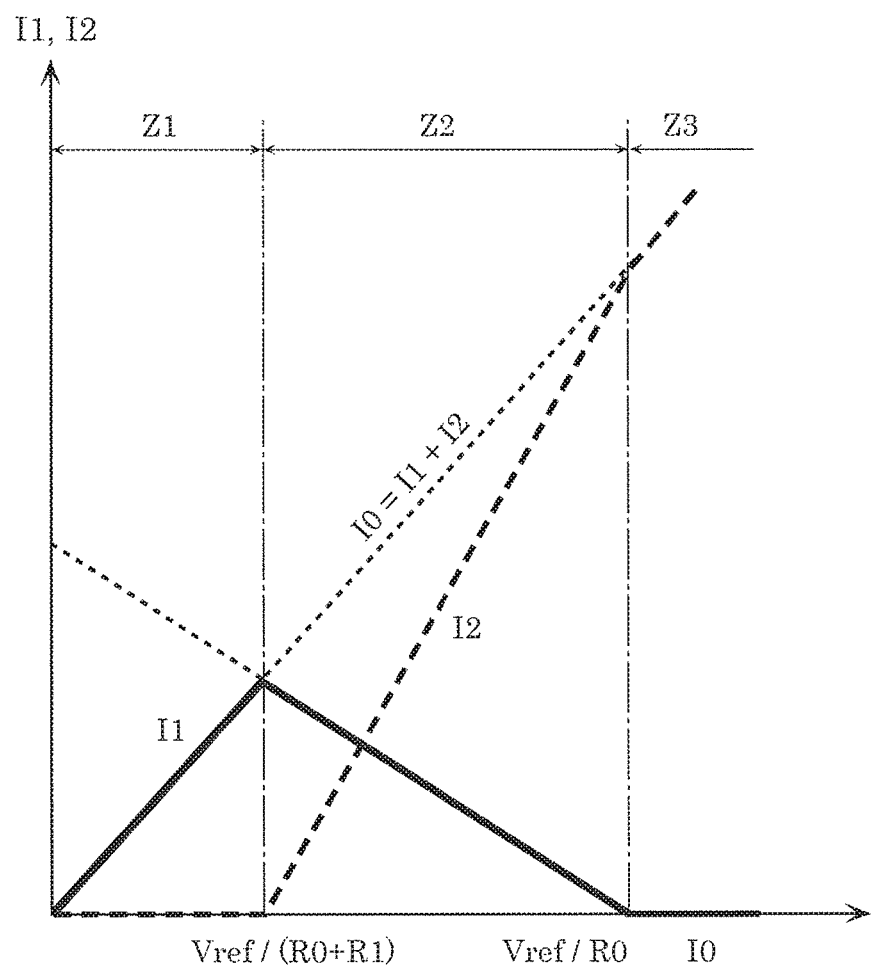
FIG. 16 is a graph illustrating an example of the relationship between a first current flowing through the first light-emitting element column and a second current flowing through the second light-emitting element column, and the constant current, in Embodiment 1.

FIG. 16 is a graph illustrating an example of the relationship between first current I1 flowing through first light-emitting element column LEDG1 and second current I2 flowing through second light-emitting element column LEDG2, and constant current I0, in this embodiment. In FIG. 16, the horizontal axis indicates the magnitude of constant current I0, and the vertical axis indicates the magnitude of first current I1 and second current I2.

In FIG. 16, the graph includes range Z1 of constant current I0 in which current I2 is 0, range Z2 of constant current I0 in which both first current I1 and second current I2 are greater than 0, and range Z3 of constant current I0 in which first current I1 is 0. As illustrated in FIG. 16, by adjusting the current flowing through first light-emitting element column LEDG1 and second light-emitting element column LEDG2, which have different color temperatures, according to constant current I0, the relationship (i.e., the color toning curve) of the color temperature of luminaire 80A with respect to constant current I0 (i.e., illumination intensity) can be adjusted. It should be noted that the dimming patterns for respective light-emitting element columns, such as those illustrated in FIG. 16 (in this embodiment, first light-emitting element column LEDG1 and second light-emitting element column LEDG2), for realizing the desired color toning curve using the luminaire 80A are referred to hereafter as "dimming patterns".

Hereinafter, operations in each range will be described.

(1) Range Z1

Range Z1 is a range in which the magnitude of constant current I0 is less than or equal to a first threshold value. In range Z1, first light-emitting element column LEDG1 is turned ON and second light-emitting element column LEDG2 is turned OFF.

At this time, since the relationship Vref≥(R0+R1)×I0 is satisfied, the first threshold value is represented by Vref/(R0+R1). In range Z1, current adjuster circuit 11A changes the magnitude of first current I1 flowing through first light-emitting element column LEDG1 so that second current I2 flowing through second light-emitting element column LEDG2 becomes 0.

In range Z1, voltage V– of the minus-side input terminal of op amp OP1 is sufficiently less than Vref, and thus the output voltage of op amp OP1 is fixed at what is called the H-level. With this, transistor Q1 operates in a linear region (i.e., what is called the drain-source resistance becomes extremely small).

Stated differently, range Z1 is a range in which the sum of the forward voltages of second light-emitting element column LEDG2 is greater than the voltage obtained by adding a voltage equivalent to the voltage drop in resistor Rd1 to the sum of the forward voltages of the first light-emitting element column LEDG1, and second current I2 of second light-emitting element column LEDG2 is 0.

(2) Range Z2

Range Z2 is a range in which the magnitude of constant current I0 is greater than the first threshold value and less than a second threshold value. It should be noted that the second threshold value is greater than the first threshold value. In range Z2, both first light-emitting element column LEDG1 and second light-emitting element column LEDG2 are turned ON.

At this time, since the relationship (R0+R1)×I0>Vref>R0×I0 is satisfied, the second threshold value is represented by Vref/R0. In range Z2, current adjuster circuit 11A adjusts the magnitude of the current flowing through first light-emitting element column LEDG1 so that first current I1 becomes smaller and second current I2 becomes bigger as constant current I0 becomes bigger.

In range Z2, the difference between voltage V– of the minus-side input terminal and voltage Vref of the plus-side input terminal of op amp OP1 becomes relatively small, and thus the output voltage of op amp OP1 becomes small. As such, transistor Q1 operates in a saturation region (i.e., operates as what is called a variable resistance element).

Specifically, when reference voltage Vref is greater than voltage V–, the output voltage of op amp OP1 becomes larger as the difference between reference voltage Vref and voltage V– is bigger. Here, voltage V– is represented by R1×I1+R0×I0.

The smaller first current I1 is, the smaller the voltage drops in resistors Rd0 and Rd1 become, and the bigger the difference between reference voltage Vref and voltage V– becomes. Consequently, the output voltage of op amp OP1, that is, the voltage of the gate terminal of transistor Q1 becomes larger. When the voltage of the gate terminal of transistor Q1 becomes larger, the resistance of transistor Q1 becomes smaller, and first current I1 becomes bigger.

The bigger first current I1 is, the bigger the voltage drops in resistors Rd0 and Rd1 become, and the smaller the difference between reference voltage Vref and voltage V– becomes. Consequently, the output voltage of op amp OP1, that is, the voltage of the gate terminal of transistor Q1 becomes smaller. When the voltage of the gate terminal of transistor Q1 becomes smaller, the resistance of transistor Q1 becomes bigger, and first current I1 becomes smaller.

In other words, in range Z2, current adjuster circuit 11A adjusts the gate voltage of transistor Q1 so that voltage V– becomes equal to reference voltage Vref. Stated differently, current adjuster circuit 11A adjusts the gate voltage of transistor Q1 so that first current I1 flowing through first light-emitting element column LEDG1 becomes the value shown in aforementioned Equation 1.

(3) Range Z3

Range Z3 is a range in which the magnitude of constant current I0 is greater than or equal to the first threshold value. In range Z3, first light-emitting element column LEDG1 is turned OFF and second light-emitting element column LEDG2 is turned ON.

At this time, since the relationship Vref≤R0×I0 is satisfied, the second threshold value is represented by Vref/R0. In range Z3, current adjuster circuit 11A sets the magnitude of the current flowing through first light-emitting element column LEDG1 to 0.

In range Z3, the voltage equivalent to the voltage drop in resistor Rd0, which is the constant current detector circuit, becomes greater than or equal to reference voltage Vref. At this time, in op amp OP1, the voltage (reference voltage Vref of the plus-side input terminal becomes less than voltage V− of the minus-side input terminal, and thus the output voltage of op amp OP1 is fixed to the L-level. As such, transistor Q1 is turned OFF, and first current I1 of first light-emitting element column LEDG1 becomes 0.

Figure 17:
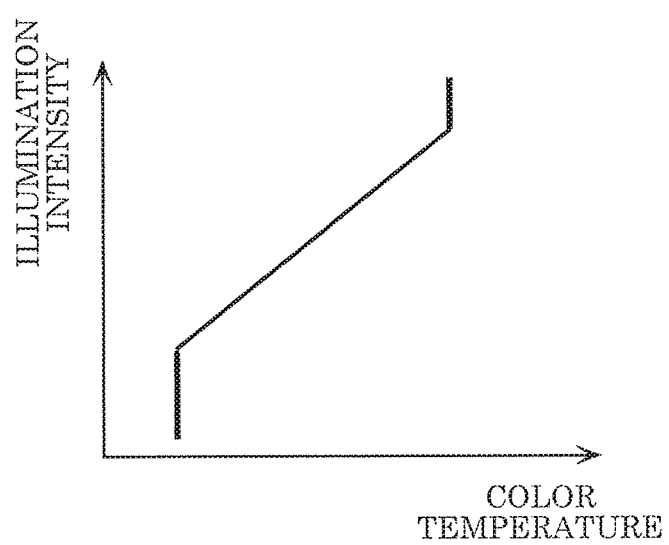
FIG. 17 is a graph illustrating the relationship between color temperature and illumination intensity of the luminaire in Embodiment 1.

FIG. 17 is a graph illustrating the relationship between the color temperature and illumination intensity of luminaire 80A in this embodiment.

As illustrated in FIG. 17, in luminaire 80A in this embodiment, while the illumination intensity is low, color temperature is low, and the illumination is of a color approximating red. In luminaire 80A, as the illumination intensity becomes higher, the color temperature rises, and the illumination is of a color approximating white. In other words, luminaire 80A allows color toning to be performed in synchronization with dimming.

[4-3. Advantageous Effects, Etc.]

Lighting apparatus 2A in this embodiment is a lighting apparatus that supplies current to first light-emitting element column LEDG1 in which one or more first light-emitting elements are connected in series and second light-emitting element column LEDG2 in which one or more first light-emitting elements are connected in series, and includes: common terminal 61; first branch terminal 62; second branch terminal 63; constant current supply 30 that supplies current to first light-emitting element column LEDG1 and second light-emitting element column LEDG2 which are connected between common terminal 61 and first branch terminal 62 and common terminal 61 and second common terminal 63, respectively, so that the sum of the currents flowing from common terminal 61 to each of first branch terminal 62 and second branch terminal 63 (i.e., constant current I0) is constant; and current adjuster circuit 11A that adjusts the magnitude of the current flowing from constant terminal 61 to first branch terminal 62.

With this, it is possible to create a state (range Z3) in which first light-emitting element column LEDG1 is turned OFF and second light-emitting element column LEDG2 is turned ON, and thus it is possible to broaden the color toning range.

In addition, in lighting apparatus 2A, the sum of the forward voltages of the second light-emitting elements in second light-emitting element column LEDG2 is greater than the sum of the forward voltages of the first light-emitting elements in first light-emitting element column LEDG1, and thus it is possible to create a state in which first light-emitting element column LEDG1 is turned ON and second light-emitting element column LEDG2 is turned OFF. This allows the color toning range to be further broadened.

Stated differently, when the magnitude of constant current I0 is less than or equal to the first threshold value, current adjuster circuit 11A adjusts the magnitude of first current I1 flowing through first light-emitting element column LEDG1 so that second current I2 flowing through second light-emitting element column LEDG2 becomes 0. In addition, when the magnitude of constant current I0 is greater than or equal to the second threshold value, current adjuster circuit 11A adjusts the magnitude of first current I1 flowing through first light-emitting element column LEDG1 to 0.

With this, it is possible to provide range Z1 in which only first light-emitting element column LEDG1 is turned ON, range Z2 in which both first light-emitting element column LEDG1 and second light-emitting element column LEDG2 are turned ON, and range Z3 in which only second light-emitting element column LEDG2 is turned ON. In other words, it is possible to create the states in range Z1 and range Z3 which do not exist in the invention in PTL 1, and the color toning range can be broadened further than in the invention in PTL 1.

In addition, lighting apparatus 2A in this embodiment can implement color toning in which color temperature changes gradually as illustrated in FIG. 17, and is thus capable of implementing color toning that is more pleasant.

Furthermore, since lighting apparatus 2A in this embodiment has a configuration in which light source unit 21A is connected to current output terminal 60, the light source connected to current output terminal 60 can be easily substituted. Accordingly, when light source 21A breaks down or when changing the color temperature of the illumination light, etc., it is possible to substitute only the light source unit 21A.

Embodiment 5

A lighting apparatus and a luminaire including the lighting apparatus in Embodiment 5 will be described using FIG. 18, FIG. 19, and FIG. 20A to FIG. 20C.

Whereas Embodiment 4 describes the case where reference voltage Vref is fixed, this embodiment describes a configuration in which reference voltage Vref is changed based on constant current I0.

5-1. Configuration]

Figure 18:
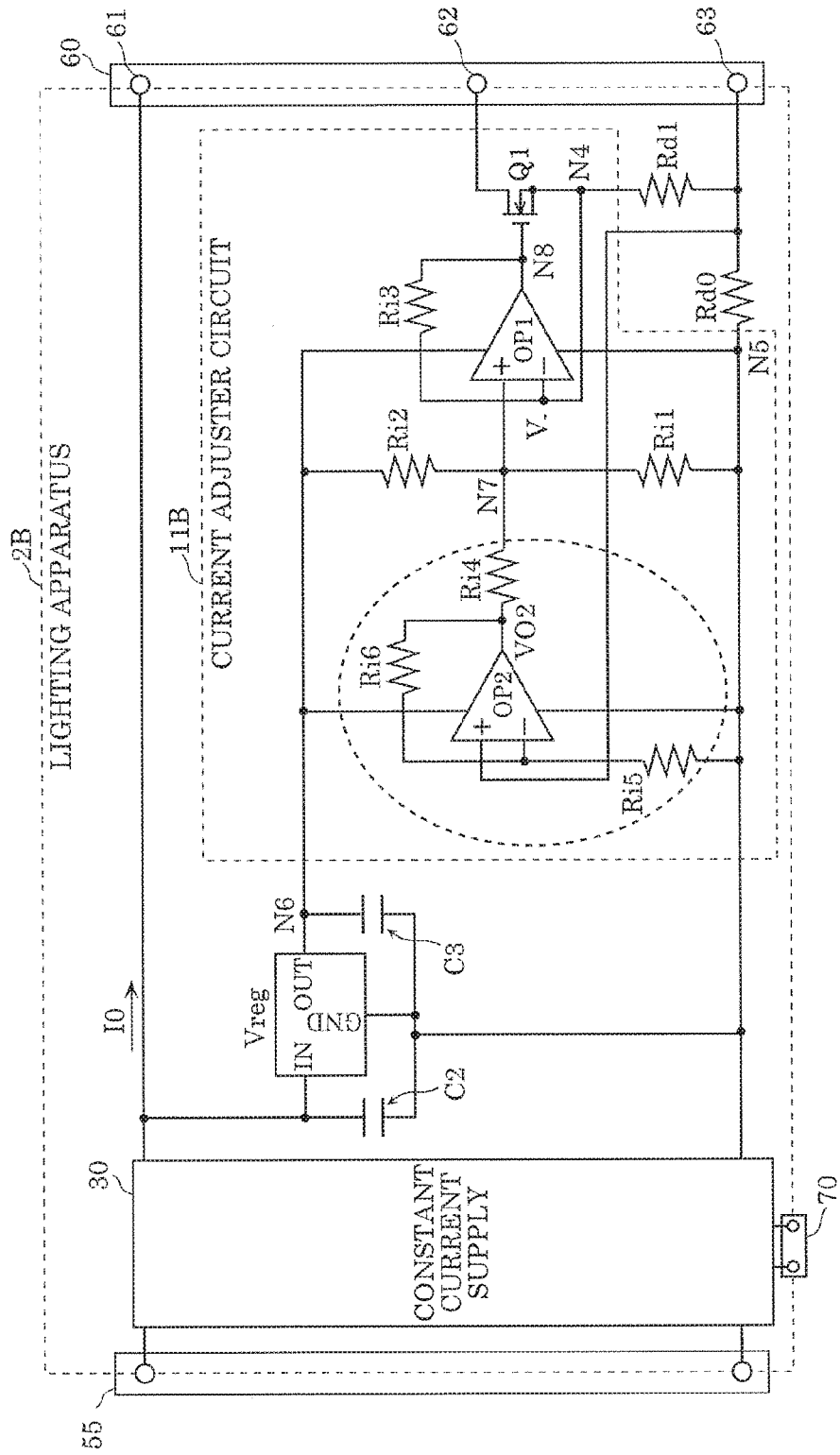
FIG. 18 is a circuit diagram illustrating an example of the circuit configuration of a lighting apparatus in Embodiment 2.

FIG. 18 is a circuit diagram illustrating an example of the circuit configuration of lighting apparatus 2B in this embodiment. In lighting apparatus 2B illustrated in FIG. 18, part of current adjuster circuit 11B, that is the portion surrounded by the oval, is different from current adjuster circuit 11A in Embodiment 4. It should be noted that, although not illustrated in FIG. 18, in this embodiment, first light-emitting element column LEDG1 is also connected between common terminal 61 and first branch terminal 62, and second light-emitting element column LEDG2 is also connected between common terminal 61 and second common terminal 63, in the same manner as in Embodiment 4.

Current adjuster circuit 11B has a configuration in which op amp OP2 and resistors Ri4 to Ri6 are added to current adjuster circuit 11A in Embodiment 4.

Op amp OP2 is an example of a reference value adjuster circuit, and amplifies a voltage corresponding to constant current I0 detected by resistor Rd0, and applies the voltage to the plus-side input terminal of op amp OP1 via resistor Ri4. Operating amp OP2 has a plus-side input terminal connected to second branch terminal 63, a minus-side input terminal connected to one end of resistor Ri5 and one end of resistor Ri6, and an output terminal connected to one end of resistor Ri4.

Resistor Ri4 has the one end connected to the output terminal of op amp OP2, and the other end connected to the plus-side input terminal of op amp OP1. Resistor Ri5 has the one end connected to the minus-side input terminal of op amp OP2 and one end of the resistor Ri6, and the other end connected to the grounding terminal (node N5) of constant current supply 30. Resistor Ri6 has the one end connected to the minus-side input terminal of op amp OP2, and the other end connected to the output terminal of op amp OP2.

It should be noted that although this embodiment describes the case where op amp OP2 is included in order to change reference voltage Vref based on constant current I0, the present disclosure is not limited to such a configuration.

Instead of op amp OP2, another circuit having non-linear characteristics such as saturation characteristics, etc., may be provided.

[5-2. Operation]

Figure 19:
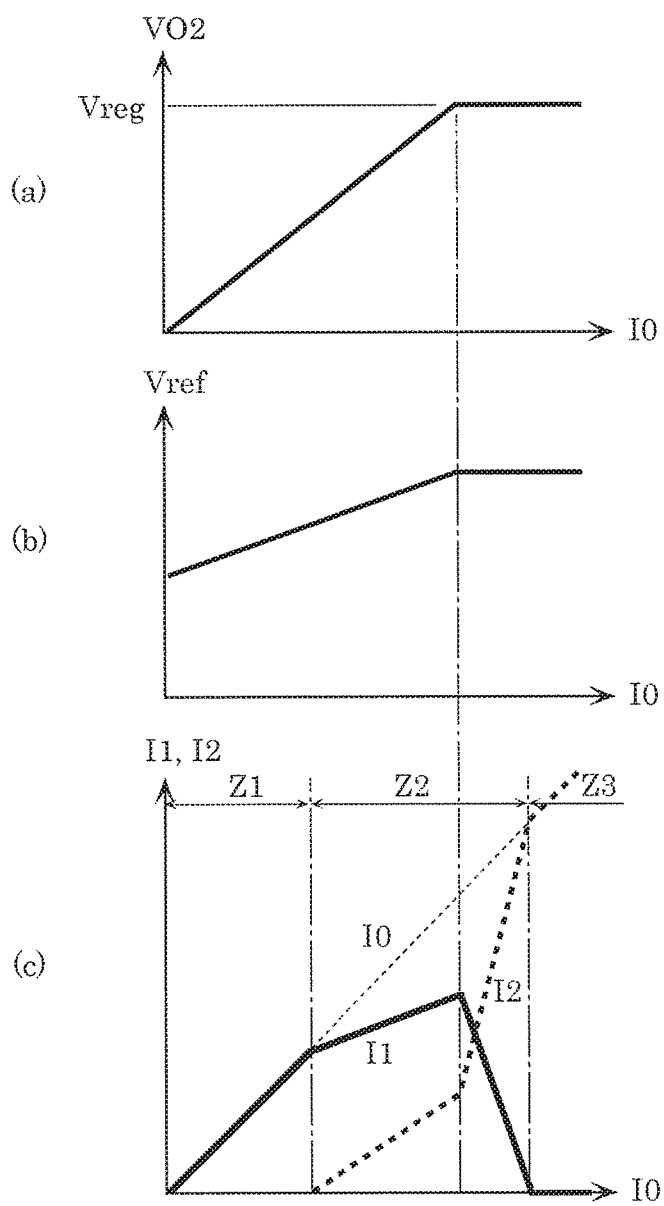
FIG. 19 illustrates graphs for describing the relationship between (a) the output of an operational amplifier which is a reference value adjuster circuit, (b) the reference voltage, and (c) an example of a dimming pattern, in Embodiment 2.

FIG. 19 illustrates graphs for describing the relationship between (a) the output of an operational amplifier which is a reference value adjuster circuit, (b) the reference voltage, and (c) an example of a dimming pattern, in this embodiment. In FIG. 19, (a) illustrates the relationship between output voltage VO2 of op amp OP2 and constant current I0, and (b) illustrates the relationship between reference voltage Vref and constant current I0. In FIG. 19, (c) illustrates the relationship between the respective currents flowing through the first light-emitting element column and the second light-emitting element column, and constant current I0.

In the graph for lighting apparatus 2A in Embodiment 4 illustrated in FIG. 16, first current I1 monotonically decreases and second current I2 monotonically increases in range Z2.

In contrast, in the graph for lighting apparatus 2B in this embodiment illustrated in FIG. 19, first current I1 increases in the initial half of range Z2 and decreases in the latter half. Accordingly, the rate of increase of second current I2 is higher in the latter half of range Z2 than in the initial half.

In other words, when the magnitude of constant current I0 is greater than or equal to a third threshold value which is greater than or equal to the first threshold value (i.e., the whole of range Z2 in Embodiment 4, and the latter half portion of range Z2 in this embodiment), current adjuster circuit 11B adjusts the magnitude of the current flowing through first light-emitting element column LEDG1 so that the magnitude of the current flowing through first light-emitting element column LEDG1 becomes smaller as constant current I0 becomes bigger.

Figure 20A:
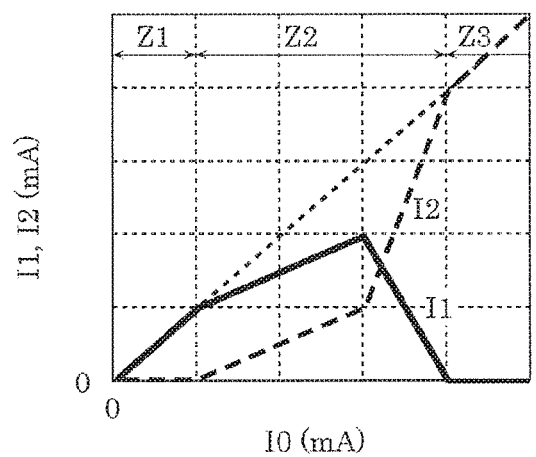
FIG. 20A is a graph illustrating an example of a dimming pattern in Embodiment 2.
Figure 20B:
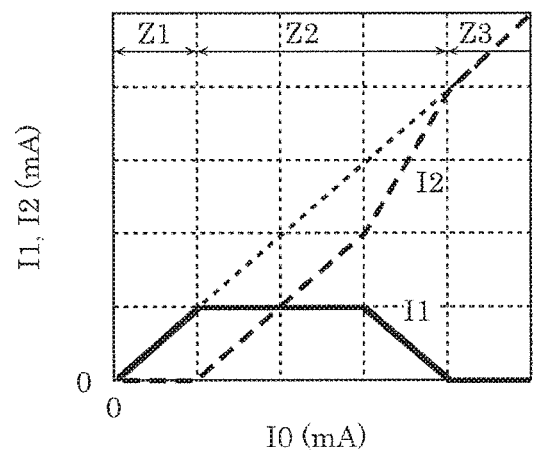
FIG. 20B is a graph illustrating another example of a dimming pattern in Embodiment 2.
Figure 20C:
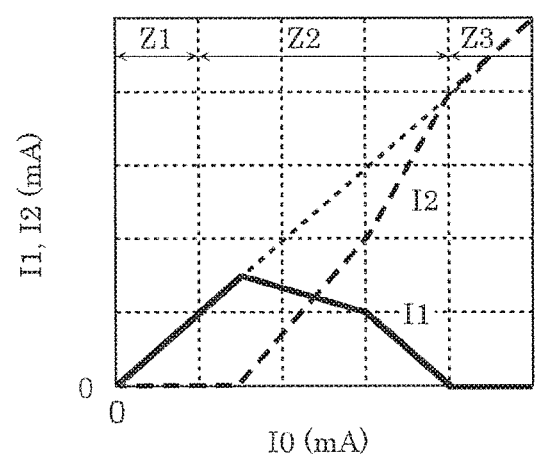
FIG. 20C is a graph illustrating another example of a dimming pattern in Embodiment 2.

FIG. 20A to FIG. 20C are graphs illustrating dimming patterns in this embodiment. By changing the magnitude of resistors Rd0, Rd1, and Ri1 to Ri6, three dimming patterns can be obtained. FIG. 20A is substantially the same as (c) in FIG. 19. FIG. 20B illustrates a dimming pattern in which first current I1 is constant in the initial half of range Z2, and decreases in the latter half. FIG. 20C illustrates the case where first current I1 decreases in range Z2, with the rate of decrease being higher in the latter half than in the initial half.

[5-3. Advantageous Effect]

In this embodiment, reference voltage Vref is changed based on constant current I0, and thus allowing variations to the dimming pattern. This allows further enhancement of the dramatic effect of lighting apparatus 2B.

In addition, this embodiment also produces the same advantageous effects as Embodiment 4.

[5-4. Variations]

Next, lighting apparatuses in variations of Embodiment 5 will be described.

Although the plus-side input terminal of op amp OP2 is connected to second branch terminal 63 in Embodiment 5, in current adjuster circuit 11B in Embodiment 5, the plus-side input terminal of op amp OP2 may be connected to node N4. Furthermore, a resistor for detecting the current flowing through second light-emitting element column LEDG2 may be provided between second branch terminal 63 and resistors Rd0 and Rd1, and the plus-side input terminal of op amp OP2 may be connected to second branch terminal 63.

Figure 21:
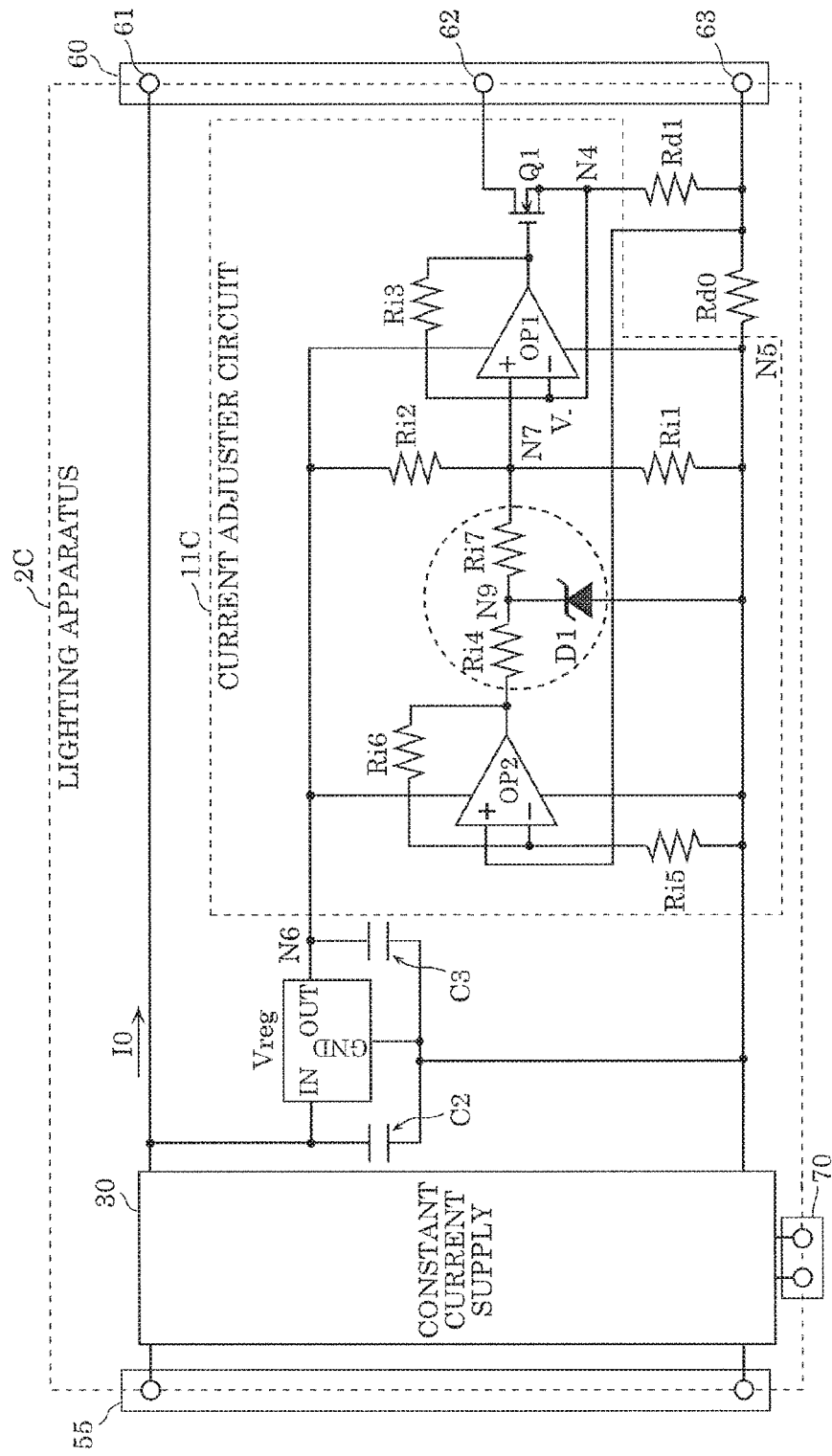
FIG. 21 is a circuit diagram illustrating an example of the circuit configuration of a lighting apparatus in a variation of Embodiment 2.

Furthermore, as illustrated in FIG. 21, a Zener diode may be used.

FIG. 21 is a circuit diagram illustrating an example of the circuit configuration of lighting apparatus 2C in a variation of Embodiment 5.

In lighting apparatus 2C illustrated in FIG. 21, in addition to the respective structural components in Embodiment 5, resistor Ri7 and Zener diode D1 are provided in current adjuster circuit 11C. Resistor Ri7 is connected between the other end of resistor Ri4 and node N7 (i.e., the plus-side input terminal of op amp OP1). Zener diode D1 has a cathode terminal connected to node N9 which is the connecting node between resistor Ri4 and resistor Ri7, and an anode terminal connected to node N5.

All the foregoing variations also allows flexible changing of the dimming pattern, which allows further enhancement of the dramatic effect of the lighting apparatus.

Embodiment 6

A lighting apparatus and a luminaire including the lighting apparatus in Embodiment 6 will be described using FIG. 22, FIG. 23A, and FIG. 23B.

Although the case where a luminaire includes two light-emitting element columns is described in Embodiments 4 and 5, it is sufficient that the number of light-emitting element columns is greater than or equal to two. In this embodiment, the case where three light-emitting element columns are included will be described.

[6-1. Luminaire Configuration]

Here, the case where the luminaire includes a lighting apparatus that realizes a color toning function, as in Embodiment 4, will be described.

Figure 22:
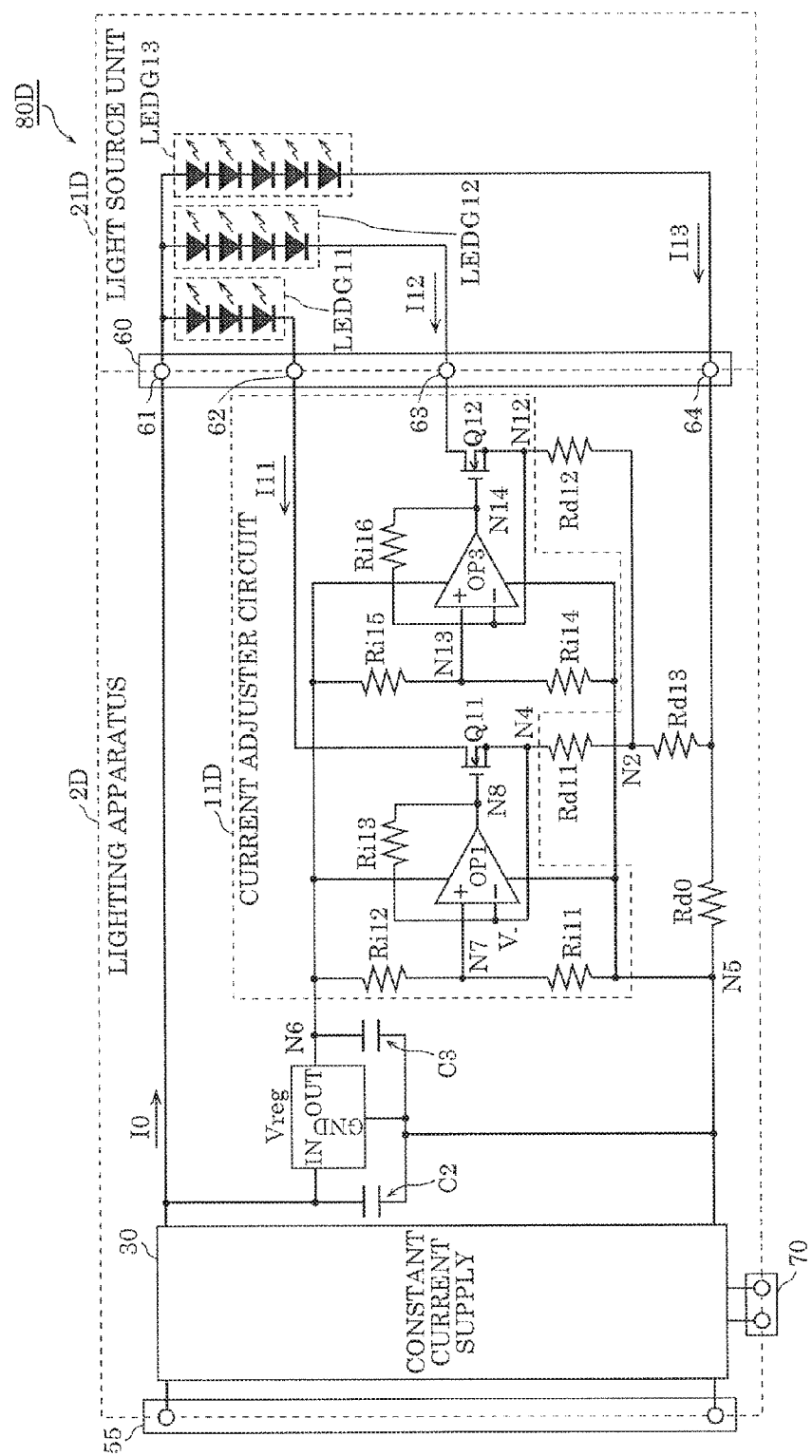
FIG. 22 is a circuit diagram illustrating an example of the circuit configuration of a lighting apparatus in Embodiment 3.

FIG. 22 is a circuit diagram illustrating an example of the circuit configuration of lighting apparatus 2D and luminaire 80D using lighting apparatus 2D, in this embodiment. As illustrated in FIG. 22, lighting apparatus 2D includes: constant current supply 30, light source unit 21D, three-terminal regulator Vreg, a first detector circuit (resistor Rd11), a second detector circuit (resistor Rd12), a third detector circuit (resistor Rd13), a constant current detector circuit (resistor Rd0), and current adjuster circuit 11D. The configurations of constant current supply 30 and three-terminal regulator Vreg are the same as in Embodiment 4.

[Light Source Unit]

Here, light source unit 21D includes the three light-emitting element columns, first light-emitting element column LEDG11, second light-emitting element column LEDG12, and third light-emitting element column LEDG13.

First light-emitting column LEDG11 is a light source in which one or more first light-emitting elements are connected in series. Second light-emitting element column LEDG12 is a light source in which one or more second light-emitting elements are connected in series. Third light-emitting element column LEDG13 is a light source in which one or more third light-emitting elements are connected in series. It should be noted that LEDs of the same color temperature are included in a single light-emitting element column, whereas color temperatures are different among the light-emitting element columns.

In this embodiment, the following relationship is satisfied: the number of LEDs of first light-emitting element column LEDG11<the number of LEDs of second light-emitting element column LEDG12<the number of LEDs of third light-emitting element column LEDG13. Here, when the forward voltages of the LEDs included in the respective light-emitting element columns are approximately the same, the following relationship is satisfied: the sum of the forward voltages of first light-emitting element column LEDG11<the sum of the forward voltages of second light-emitting element column LEDG12<the sum of the forward voltages of third light-emitting element column LEDG13. Therefore, the timing at which current starts to flow to the three light-emitting element columns can be staggered.

The anode terminal of first light-emitting element column LEDG11, the anode terminal of second light-emitting element column LEDG12, and the anode terminal of third light-emitting element column LEDG13 are connected to common terminal 61 of current output terminal 60. The cathode terminal of first light-emitting element column LEDG11 is connected to first branch terminal 62, the cathode terminal of second light-emitting element column LEDG12 is connected to second branch terminal 63, and the cathode terminal of third light-emitting element column LEDG13 is connected to third branch terminal 64.

Furthermore, the current flowing through first light-emitting element column LEDG11 is referred to as first current I11, the current flowing through second light-emitting element column LEDG12 is referred to as second current I12, and the current flowing through third light-emitting element column LEDG13 is referred to as third current I13.

[First Detector Circuit]

The first detector circuit is resistor Rd11 which detects the magnitude of first current I11 flowing through first light-emitting element column LEDG11, and has one end connected to node N4 (i.e., the cathode terminal of first light-emitting element column LEDG11 via transistor Q11), and the other end connected to node N2 (i.e., the connecting node on the cathode terminal side of first light-emitting element column LEDG11 and second light-emitting element column LEDG12).

[Second Detector Circuit]

The second detector circuit is resistor Rd12 which detects the magnitude of second current I12 flowing through second light-emitting element column LEDG12, and has one end connected to node N12 (i.e., the cathode terminal of second light-emitting element column LEDG12 via transistor Q12), and the other end connected to N2.

[Third Detector Circuit]

The third detector circuit is resistor Rd13 which detects the magnitude of first current I11 flowing through first light-emitting element column LEDG11 and second current I12 flowing through second light-emitting element column LEDG12, and has on end connected to node N2 and the other connected to third branch terminal 64.

[Constant Current Detector Circuit]

The constant current detector circuit is resistor Rd0 which detects the magnitude of constant current I0, and has one end connected to third branch terminal 64, and the other end connected to the low voltage-side terminal (node N5) of constant current supply 30.

It should be noted that, where the resistance of resistor Rd0 is denoted as R0, the resistance of resistor Rd11 is denoted as R1, the resistance of resistor Rd13 is denoted as R3, and the voltage of the low voltage-side terminal (node N5) of constant current supply 30 is the grounding voltage, the voltage of node N4 used for controlling first light-emitting element column LEDG11 is represented by: $R0 \times I0 + R3 \times (I11 + I12) + R1 \times I11$.

Furthermore, where the resistance of resistor Rd12 is denoted as R2, the voltage of node N12 used for controlling second light-emitting element column LEDG12 is represented by: $R0 \times I0 + R3 \times (I11 + I12) + R2 \times I12$.

[Current Adjuster Circuit]

Current adjuster circuit 11D is a circuit that adjusts the magnitude of the current flowing through first light-emitting element column LEDG11, according to the magnitude of the current detected by the first detector circuit, and adjusts the magnitude of the current flowing through second light-emitting element column LEDG12, according to the magnitude of the current detected by the second detector circuit.

It should be noted that, when the light source unit includes three or more stages of light-emitting element columns, it is sufficient to have light-emitting element column(s) to which a current adjuster circuit is provided and light-emitting element column(s) to which a current adjuster circuit is not provided. Here, the current adjuster circuit is provided to first light-emitting element column LEDG11 and second light-emitting element column LEDG12, and the current adjuster circuit is not provided to third light-emitting element column LEDG13.

As a first current adjuster circuit that adjusts the magnitude of first current I11 flowing through first light-emitting element column LEDG11, current adjuster circuit 11D includes: a first voltage divider circuit including resistors Ri11 and Ri12; transistor Q11, and a first comparator amplifier circuit including op amp OP1 and resistor Ri13, as illustrated in FIG. 22. The configurations of the first voltage divider circuit, transistor Q11, and the first comparator amplifier circuit are the same as those in current adjustor circuit 11A in Embodiment 4.

In addition, as a second current adjuster circuit that adjusts the magnitude of second current I12 flowing through second light-emitting element column LEDG12, current adjuster circuit 11D includes: a second voltage divider circuit including resistors Ri14 and Ri15; transistor Q12, and a second comparator amplifier circuit including op amp OP3 and resistor Ri16, as illustrated in FIG. 22. The configuration of the second current adjuster circuit is basically the same as the configuration of the first current adjuster circuit.

Resistor Ri14 included in the second voltage divider circuit has one end connected to node N5, and the other end connected to node N13 which is the output node of the second voltage divider circuit. Resistor Ri15 has one end connected to node N13 and the other end connected to node N6 which is the output node of three-terminal regulator Vreg. Where the resistance of resistor Ri14 is denoted as R14 and the resistance of resistor Ri15 is denoted as R15, the output voltage of the second voltage divider circuit is a voltage calculated by: (output voltage of three-terminal regulator Vreg)$\times R14/(R14+R15)$. This becomes reference voltage Vref of the second current adjuster circuit. It should be noted that reference voltage Vref of the second current adjuster circuit may be different from reference voltage Vref of the first current adjuster circuit.

Transistor Q12 is a transistor that adjusts the current flowing through second light-emitting element column LEDG12. Transistor Q12 is a MOSFET, and has a gate terminal connected to the output terminal (node N14) of op amp OP3, a drain terminal connected to the cathode terminal of second light-emitting element column LEDG12 (second branch terminal 63), and a source terminal connected to the minus-side input terminal of op amp OP3 and the one end (node N12) of resistor Rd12.

The second comparator amplifier circuit is a circuit that compares the total of voltages equivalent to the voltage drops in resistor Rd12, resistor Rd13, and resistor Rd0 with a reference value, and applies, to the control terminal of transistor Q12, a voltage which is in accordance with the result of the comparison. Here, the comparator amplifier circuit is op amp OP3 having a plus-side input terminal connected to the output node (node N13) of the first voltage divider circuit, the minus-side input terminal connected to node N12, and an output terminal connected to the gate terminal of transistor Q12. Resistor Ri16 is connected between the minus-side input terminal and the output terminal of op amp OP3.

[6-2. Operation]

The operation of current adjuster circuit 11D will be described using FIG. 23A and FIG. 23B. FIG. 23A and FIG. 23B are graphs illustrating examples of the relationship between first current I11 flowing through first light-emitting element column LEDG11, second current I12 flowing through second light-emitting element column LEDG12, and third current I13 flowing through third light-emitting element column LEDG13, and constant current I0, in this embodiment. It should be noted that FIG. 23A illustrates the case where the resistance of resistor Rd13 is 0 (i.e., the case where resistor Rd13 is not used).

Figure 23A:
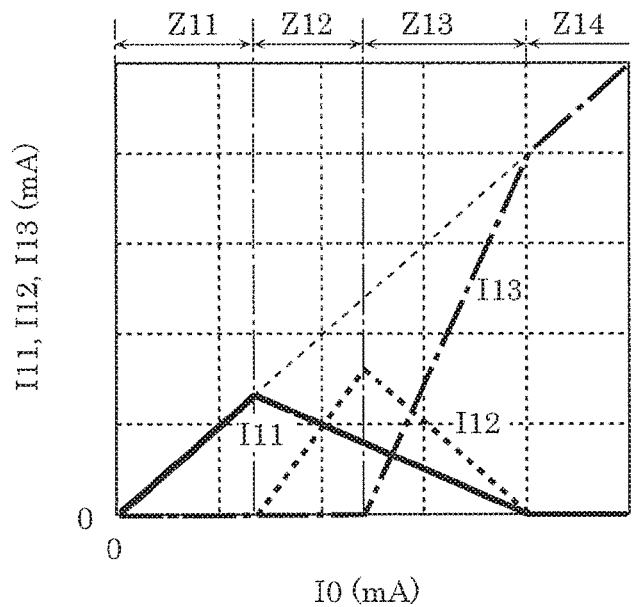
FIG. 23A is a graph illustrating an example of the relationship between a first current flowing through the first light-emitting element column, a second current flowing through the second light-emitting element column, and a third current flowing through the third light-emitting element column, and the constant current, in Embodiment 3.
Figure 23B:
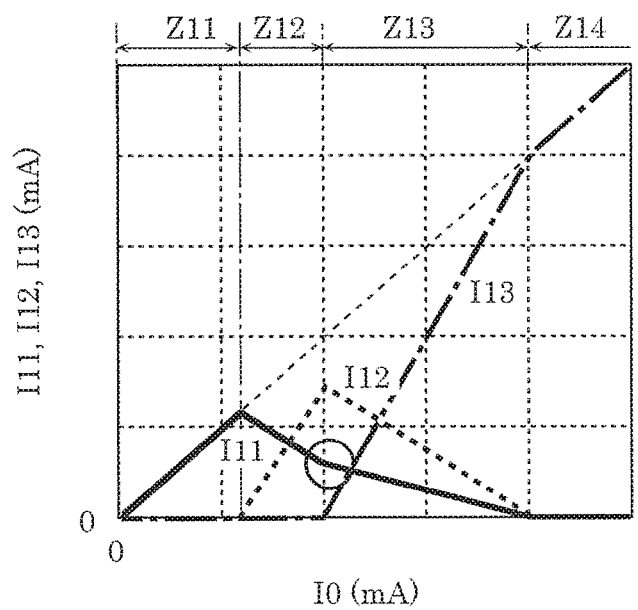
FIG. 23B is a graph illustrating another example of the relationship between the first current flowing through the first light-emitting element column, the second current flowing through the second light-emitting element column, and the third current flowing through the third light-emitting element column, and the constant current, in Embodiment 3.

In FIG. 23A and FIG. 23B, the graphs include range Z11 in which second current I12 and third current I13 are 0, range Z12 in which third current I13 is 0, range Z13 in which first current I11, second current I12, and third current I13 are greater than 0, and range Z4 in which first current I11 and second current I12 are 0.

For example, it is assumed that the color temperature of first light-emitting element column LEDG11 is 2700 K, the color temperature of third light-emitting element column LEDG13 is 5000 K, and the color temperature of second light-emitting element column LEDG12 is a color temperature halfway between the color temperature of first light-emitting element column LEDG11 and the color temperature of third light-emitting element column LEDG13.

In this case, in range Z11, red-colored illumination light of low illumination intensity is emitted from luminaire 80D. In range Z12, the illumination intensity of first light-emitting element column LEDG11 gradually decreases, and the illumination intensity of second light-emitting element column LEDG12 gradually increases. In range Z13, the illumination intensity of first light-emitting element column LEDG11 and second light-emitting element column LEDG12 gradually decrease, and become 0 at the start of range Z14. From the start of range Z13, the illumination intensity of third light-emitting element column LEDG13 gradually increases. In range Z14, third light-emitting element column LEDG13 is turned ON and the other light-emitting element columns are turned OFF.

It should be noted that the slope of first current I11 in ranges Z12 and Z13 is different between the case illustrated in FIG. 23A, in which resistor Rd13 is not provided, and the case illustrated in FIG. 23B.

[6-3. Advantageous Effect]

In this embodiment, the case where three light-emitting element columns are included is described. In the case where three light-emitting element columns are included, it is also possible to realize range Z11 in which first light-emitting element column LEDG11 is turned ON and the other light-emitting element columns are turned OFF, and range Z14 in which third light-emitting element column LEDG13 is turned ON and the other light-emitting element columns are turned OFF, as illustrated in FIG. 23A and FIG. 23B, and thus it is possible to broaden the color toning range.

In addition, in this embodiment, lighting apparatus 2D can implement color toning that gradually changes the color temperature as that illustrated in FIG. 23A and FIG. 23B, and thus it is also possible to implement more pleasant color toning.

Embodiment 7

A lighting apparatus and a luminaire including the lighting apparatus in Embodiment 7 will be described using FIG. 24, FIG. 25, FIG. 26A, FIG. 26B, and FIG. 27.

In this embodiment, a configuration in which reference voltage Vref is changed based on constant current I0, and which is different from the configuration in Embodiment 5 will be described.

[7-1. Configuration]

Figure 24:
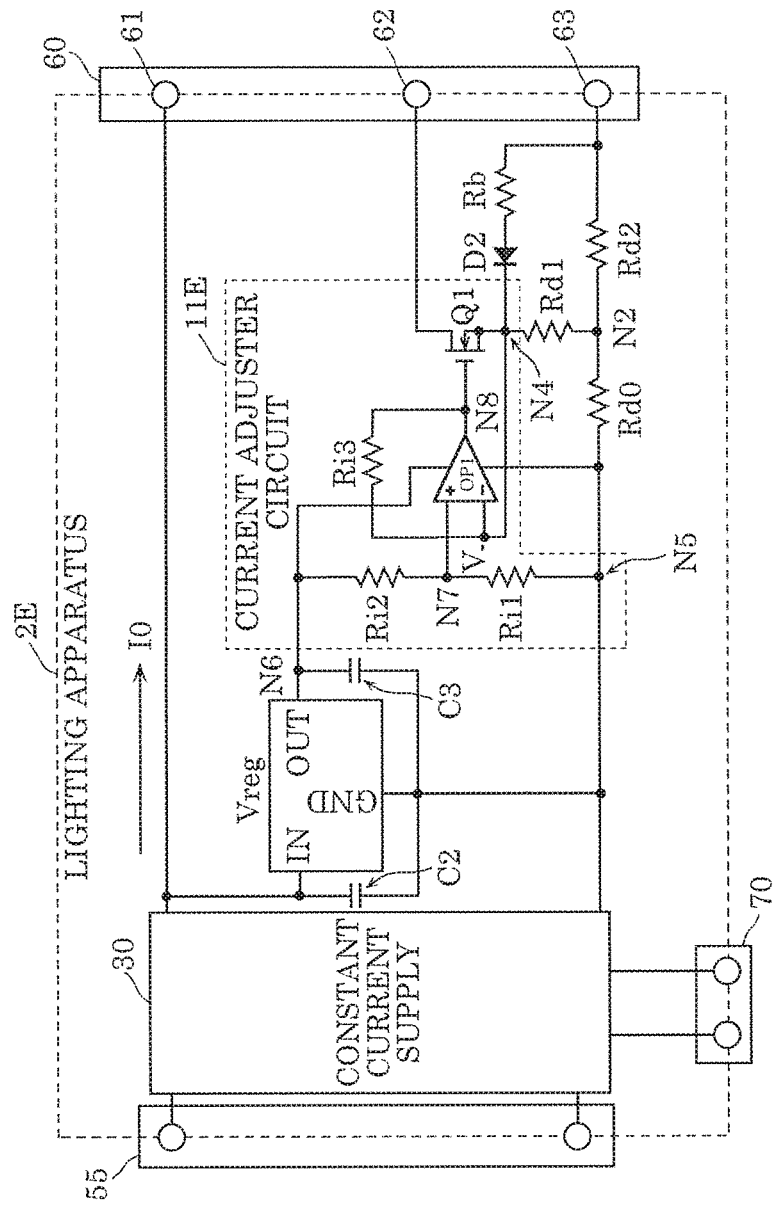
FIG. 24 is a circuit diagram illustrating an example of the circuit configuration of a lighting apparatus in Embodiment 4.

FIG. 24 is a circuit diagram illustrating an example of the circuit configuration of lighting apparatus 2E in this embodiment. As illustrated in FIG. 24, lighting apparatus 2E includes, constant current supply 30, three-terminal regulator Vreg, a first detector circuit (resistor Rd1), a second detector circuit (resistor Rd2), a constant current detector circuit (resistor Rd0), current adjuster circuit 11E, and a bypass circuit. Lighting apparatus 2E illustrated in FIG. 24 is different from lighting apparatus 2A in Embodiment 4 in including the second detector circuit (resistor Rd2) between second branch terminal 63 and node N2, and including the bypass circuit between second branch terminal 63 and node N4. It should be noted that, although not illustrated in FIG. 24, in this embodiment, first light-emitting element column LEDG1 is also connected between common terminal 61 and first branch terminal 62, and second light-emitting element column LEDG2 is also connected between common terminal 61 and second common terminal 63, in the same manner as in Embodiment 4.

[Second Detector Circuit]

The second detector circuit is a circuit that detects the magnitude of second current I2 flowing through second light-emitting element column LEDG2. The second detector circuit is connected in series with second light-emitting element column LEDG2. More specifically, in this embodiment, the second detector circuit is resistor Rd2 having one end connected to second branch terminal 63 and the other end connected to node N2.

[Bypass Circuit]

The bypass circuit is a circuit that passes, to the first detector circuit, at least part of the current flowing through second light-emitting element column LEDG2, when a predetermined condition is satisfied. Specifically, the bypass circuit is a circuit in which diode D2 and resistor Rb are connected in series. Diode D2 has a cathode terminal connected to node N4, and an anode terminal connected to one end of resistor Rb. Resistor Rb has the one end connected to the anode terminal of diode D2, and the other end connected to second branch terminal 63.

According to the above-described configuration, the predetermined condition is that: the voltage of second branch terminal 63>the voltage of node N4+the forward voltage of diode D2. Stated differently, the predetermined condition is that the voltage equivalent to the voltage drop in the second light-emitting element column is less than a value obtained by subtracting the forward voltage of diode D2 from the voltage equivalent to the voltage drop in the first light-emitting element column. The bypass circuit passes, to the first detector circuit, at least part of the current flowing through second light-emitting element column LEDG2, when the voltage of second branch terminal 63 is greater than the sum of the voltage of node N4 and the forward voltage of diode D2 (i.e., when the predetermined condition is satisfied).

Here, as described in Embodiment 4, a voltage obtained by adding, to the voltage of the low voltage-side terminal (node N5) of constant current supply 30, a voltage equivalent to the voltage drop in resistor Rd0 and a voltage equivalent to the voltage drop in resistor Rd1, which is the first detector circuit, is inputted to the minus-side input terminal of op amp OP1.

33

[Current Adjuster Circuit]

Current adjuster circuit 11E is different from current adjuster circuit 11A in Embodiment 4 in that the bypass circuit is connected to node N4. Accordingly, in this embodiment, where the resistance of resistor Rd1 is denoted as R1, and the current supplied from the bypass circuit is denoted as Ib, the voltage equivalent to the voltage drop in resistor Rd1 is represented by R1×(I1+Ib). Where the voltage of the low voltage-side terminal (node N5) of constant current supply 30 is the grounding voltage, a voltage R0×I0+R1 (I1+Ib) is inputted to the minus-side input terminal of op amp OP1.

As described above, in this embodiment, the sum of first current I1 and bypass current Ib is detected by first detector circuit, and thus current adjuster circuit 11E adjusts first current I1 based not only on the first current but also on second current I2.

[7-2. Operation]

Figure 25:
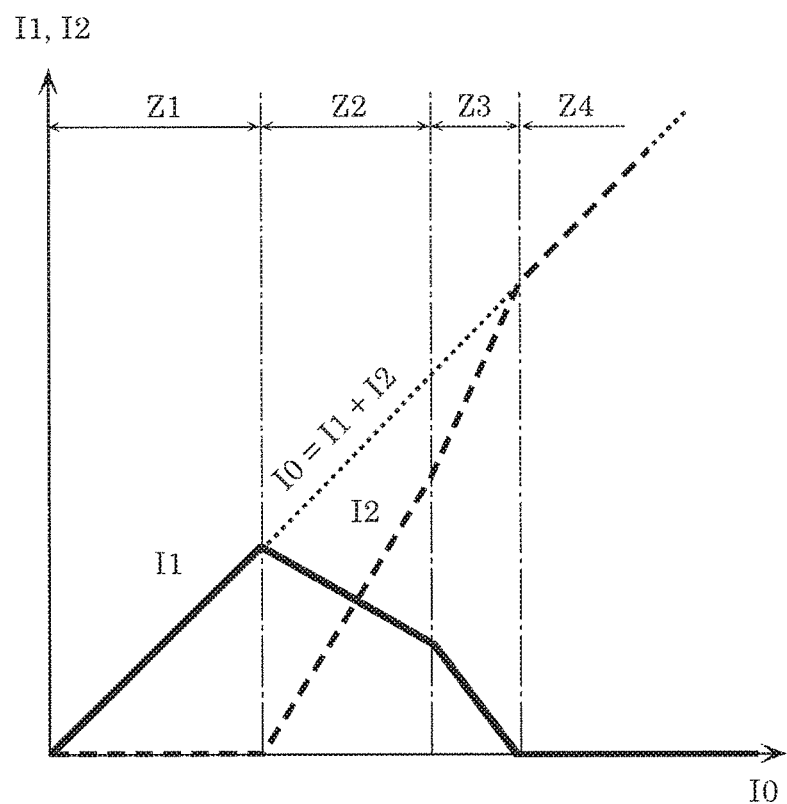
FIG. 25 is a graph illustrating an example of the relationship between a first current flowing through a first light-emitting element column and a second current flowing through a second light-emitting element column, and a constant current, in Embodiment 4.

The operation of current adjuster circuit 11E will be described using FIG. 25. FIG. 25 is a graph illustrating an example of the relationship between first current I1 flowing through first light-emitting element column LEDG1 and second current I2 flowing through second light-emitting element column LEDG2, and constant current I0, in this embodiment. In FIG. 25, the horizontal axis indicates the magnitude of constant current I0, and the vertical axis indicates the magnitude of first current I1 and second current I2.

In FIG. 25, the graph includes range Z1 in which second current I2 is 0, ranges Z2 and Z3 in which both first current I1 and second current I2 are greater than 0, and range Z4 in which first current I1 is 0.

(1) Range Z1

The operation of current adjuster circuit 11E in range Z1 is the same as the operation of current adjuster circuit 11A in range Z1 in Embodiment 4.

(2) Range Z2

Range Z2 is a range in which current is not supplied from the bypass circuit (i.e., the range in which the predetermined condition is not satisfied), out of the range in which the magnitude of constant current I0 is greater than the first threshold value and less than a second threshold value (i.e., range Z2+range Z3). It should be noted that the second threshold value is greater than the first threshold value. In range Z2, both first light-emitting element column LEDG1 and second light-emitting element column LEDG2 are turned ON.

In range Z2, where the resistance of resistor Rd2 is denoted as R2, and the forward voltage of diode D2 is denoted as Vd, the following relationships are satisfied: (R0+R1)×I0>Vref>R0×I0; and R1×I1>R2×I2+Vd. In range Z2, current adjuster circuit 11E adjusts the magnitude of the current flowing through first light-emitting element column LEDG1 so that first current I1 becomes smaller and second current I2 becomes bigger as constant current I0 becomes bigger.

In range Z2, the difference between voltage V− of the minus-side input terminal and voltage Vref of the plus-side input terminal of op amp OP1 becomes relatively small, and thus the output voltage of op amp OP1 becomes small. As such, transistor Q1 operates in a saturation region (i.e., operates as what is called a variable resistance element).

Specifically, when reference voltage Vref is greater than voltage V−, the output voltage of op amp OP1 becomes larger as the difference between reference voltage Vref and voltage V− is bigger. Here, voltage V− is represented by R1×I1+R0×I0.

34

The smaller first current I1 is, the smaller the voltage drops in resistors Rd0 and Rd1 become, and the bigger the difference between reference voltage Vref and voltage V− becomes. Consequently, the output voltage of op amp OP1, that is, the voltage of the gate terminal of transistor Q1 becomes larger. When the voltage of the gate terminal of transistor Q1 becomes larger, the resistance of transistor Q1 becomes smaller, and first current I1 becomes bigger.

The bigger first current I1 is, the bigger the voltage drops in resistors Rd0 and Rd1 become, and the smaller the difference between reference voltage Vref and voltage V− becomes. Consequently, the output voltage of op amp OP1, that is, the voltage of the gate terminal of transistor Q1 becomes smaller. When the voltage of the gate terminal of transistor Q1 becomes smaller, the resistance of transistor Q1 becomes bigger, and first current I1 becomes smaller.

In other words, in range Z2, current adjuster circuit 11E adjusts the gate voltage of transistor Q1 so that voltage V− becomes equal to reference voltage Vref. Stated differently, current adjuster circuit 11E adjusts the gate voltage of transistor Q1 so that first current I1 flowing through first light-emitting element column LEDG1 becomes the value shown in aforementioned Equation 1.

(3) Range Z3

Range Z3 is a range in which current is supplied from the bypass circuit (i.e., the range in which the predetermined condition is satisfied), out of the range in which the magnitude of constant current I0 is greater than the first threshold value and less than a second threshold value (i.e., range Z2+range Z3). In range Z3, both first light-emitting element column LEDG1 and second light-emitting element column LEDG2 are turned ON.

In range Z3, the following relationships are satisfied: (R0+R1)×I0>Vref>R0×I0; and R1×(I1+Ib)≤R2×(I2−Ib)+Vd. In range Z3, current adjuster circuit 11E adjusts the magnitude of the current flowing through first light-emitting element column LEDG1 so that current I1 becomes smaller and current I2 becomes bigger as constant current I0 becomes bigger, as in the case of range Z2. It should be noted that, in the graph, the slopes of current I1 and current I2 are different between ranges Z2 and Z3.

The operation of op amp OP1 in range Z3 is basically the same as the operation in range Z2. In range Z3, current adjuster circuit 11E adjusts the gate voltage of transistor Q1 so that first current I1 flowing through first light-emitting element column LEDG1 becomes the value shown in Equation 2 below.

$$I1=(Vref-R0\times I0)/R1-Ib \quad \text{(Equation 2)}$$

(4) Range Z4

The operation of current adjuster circuit 11E in range Z4 is the same as the operation of current adjuster circuit 11A in range Z3 in Embodiment 4.

[7-3. Advantageous Effects, Etc.]

Lighting apparatus 2E in this embodiment includes: the first detector circuit that detects the magnitude of first current I1 flowing in first light-emitting element column LEDG1; the second detector circuit that detects the magnitude of second current I2 flowing in second light-emitting element column LEDG2; the bypass circuit that passes part of second current I2 to the first detector circuit; and current adjuster circuit 11E that adjusts the magnitude of the current flowing through first light-emitting element column LEDG1, according to the magnitude of the current detected by the first detector circuit.

With this, it is possible to create a state (range Z4) in which first light-emitting element column LEDG1 is turned OFF and second light-emitting element column LEDG2 is turned ON, and thus it is possible to broaden the color toning range.

In addition, in lighting apparatus 2E, the sum of the forward voltages of second light-emitting element column LEDG2 is greater than the sum of the forward voltages of first light-emitting element column LEDG1, and thus it is possible to create a state in which first light-emitting element column LEDG1 is turned ON and second light-emitting element column LEDG2 is turned OFF. This allows the color toning range to be further broadened.

Stated differently, when the magnitude of constant current I0 is less than or equal to the first threshold value, current adjuster circuit 11E adjusts the magnitude of first current I1 flowing through first light-emitting element column LEDG1 so that second current I2 flowing through second light-emitting element column LEDG2 becomes 0. In addition, when the magnitude of constant current I0 is greater than or equal to the second threshold value, current adjuster circuit 11E adjusts the magnitude of first current I1 flowing through first light-emitting element column LEDG1 to 0.

With this, it is possible to provide range Z1 in which only first light-emitting element column LEDG1 is turned ON, ranges Z2 and Z3 in which both first light-emitting element column LEDG1 and second light-emitting element column LEDG2 are turned ON, and range Z4 in which only second light-emitting element column LEDG2 is turned ON. In other words, it is possible to create the states in range Z1 and range Z4 which do not exist in the invention in PTL 1, and thus the color toning range can be broadened.

In addition, by having the bypass circuit, lighting apparatus 2E in this embodiment is capable of changing the amount of change in illumination intensity, in the range where both first light-emitting element column LEDG1 and second light-emitting element column LEDG2 are turned ON, as illustrated in FIG. 25. With this, more pleasant color toning can be implemented.

Figure 26A:
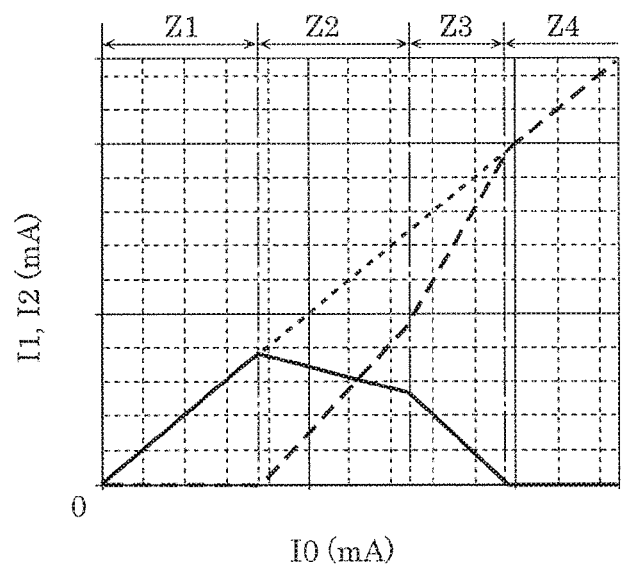
FIG. 26A is a graph illustrating another example of a dimming pattern in Embodiment 4.
Figure 26B:
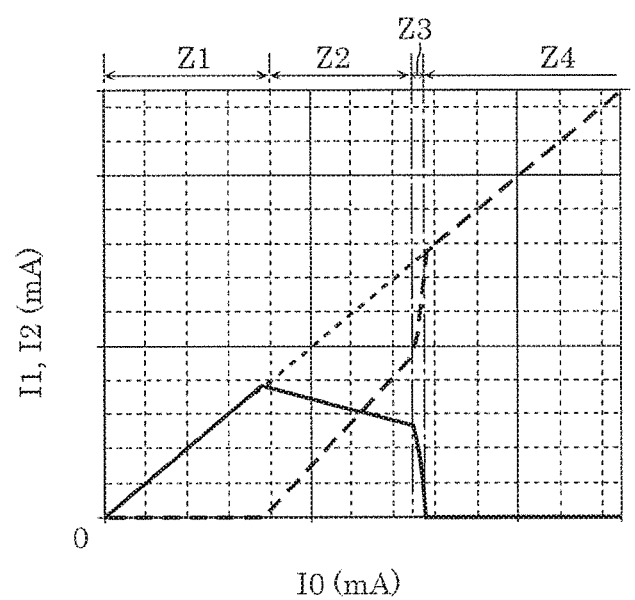
FIG. 26B is a graph illustrating another example of a dimming pattern in Embodiment 4.

FIG. 26A and FIG. 26B are graphs illustrating examples of other dimming patterns in this embodiment. Compared to FIG. 25, FIG. 26A and FIG. 26B illustrate examples of cases in which the resistance of the resistors (Rd0 to Rd2) are changed. In this manner, by setting the resistances of the resistors, dimming that is in accordance with the type of the luminaire can be obtained.

[7-4. Variations]

Figure 27:
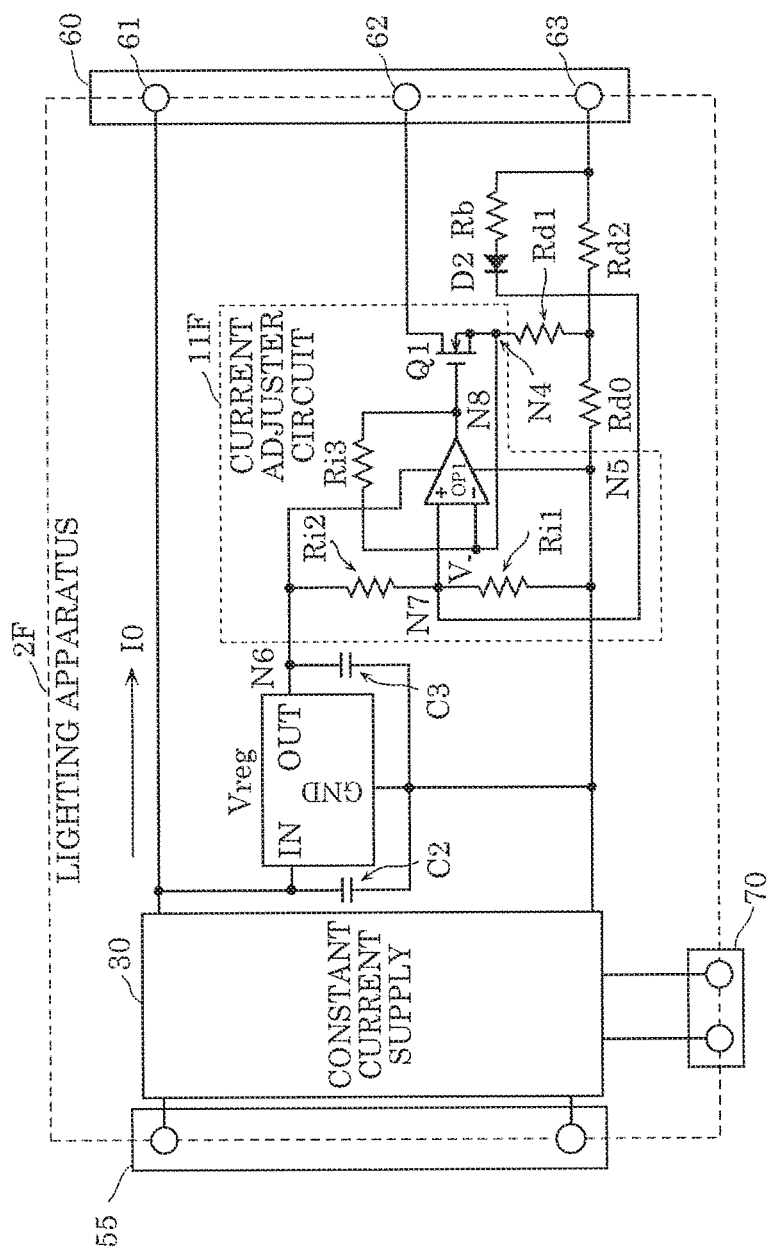
FIG. 27 is a circuit diagram illustrating an example of the circuit configuration of a lighting apparatus in a variation of Embodiment 4.

FIG. 27 is a circuit diagram illustrating an example of the circuit configuration of lighting apparatus 2F in a variation of this embodiment. Whereas the cathode terminal of diode D2 of the bypass circuit is connected to node N4 in current adjuster circuit 11E in the foregoing embodiment, in current adjuster circuit 11F included in lighting apparatus 2F in this variation, the cathode terminal of diode D2 of the bypass circuit is connected to the plus-side input terminal of op amp OP1.

Furthermore, in this embodiment and the variation of this embodiment, an amplifier circuit may be added to the bypass circuit.

This variation also produces the same advantageous effects as in the foregoing embodiment.

[Others]

Although illumination systems and luminaires according to the present disclosure are described thus far based on the foregoing embodiments and variations thereof, the present disclosure is not limited to the foregoing embodiments and variations.

(1) For example, although the case where the first light-emitting elements and the second light-emitting elements are LEDs is exemplified in Embodiments 1 to 7, the present disclosure is not limited to such a configuration. The first light-emitting elements and the second light-emitting elements may be configured of other light-emitting elements such as organic electroluminescence (EL) elements, etc.

(2) Although Embodiments 1 to 7 exemplify the case where the magnitude of the forward voltages is the same (the same type) for all the LEDs which are examples of the first light-emitting elements and the second light-emitting elements, the present disclosure is not limited to such a configuration. It is preferable that the following relationship be satisfied: the sum of the forward voltages of the first light-emitting element column<the sum of the forward voltages of the light-emitting element column in the last stage. The light-emitting element column in the last stage is the light-emitting element column to which a current adjuster circuit is not provided, and is second light-emitting element column LEDG2 in Embodiments 1 and 2, and third light-emitting element column LEDG13 in Embodiment 3.

(3) Although the foregoing embodiment describes the case where the illumination system includes plural light-emitting element columns between which both color temperature and light distribution characteristics are different, the present disclosure is not limited to such a configuration. The illumination system may be of another configuration such as one which includes plural light-emitting element columns between which, for example, only the color temperature or only the light distribution characteristics is different.

(4) Although the number of LEDs included in first light-emitting element column LEDG1 is set to 4, and the number of LEDs included in second light-emitting element column LEDG2 is set to 5 in Embodiments 1 and 2, the present disclosure is not limited to such a configuration. In the same manner, although the number of LEDs included in first light-emitting element column LEDG11 is set to 3, the number of LEDs included in second light-emitting element column LEDG12 is set to 4, and the number of LEDs included in third light-emitting element column LEDG13 is set to 5 in Embodiment 3, the present disclosure is not limited to such a configuration.

It should be noted that, in Embodiments 1 and 2, due to the difference in the sums of the forward voltages, the timing for starting light-emission for second light-emitting element column LEDG2 is staggered with respect to first light-emitting element column LEDG1, and thus it is preferable that the number of LEDs in second light-emitting element column LEDG2 be greater than the number of LEDs in first light-emitting element column LEDG1. In the same manner, in the case where three or more light-emitting element columns are included, it is preferable that the number of LEDs be determined in such a way as to provide a difference among the sums of the respective light-emitting element columns.

(5) Although a constant current detector circuit is provided in Embodiments 1 to 7, the constant current detector circuit is not an essential structural component.

Figure 28:
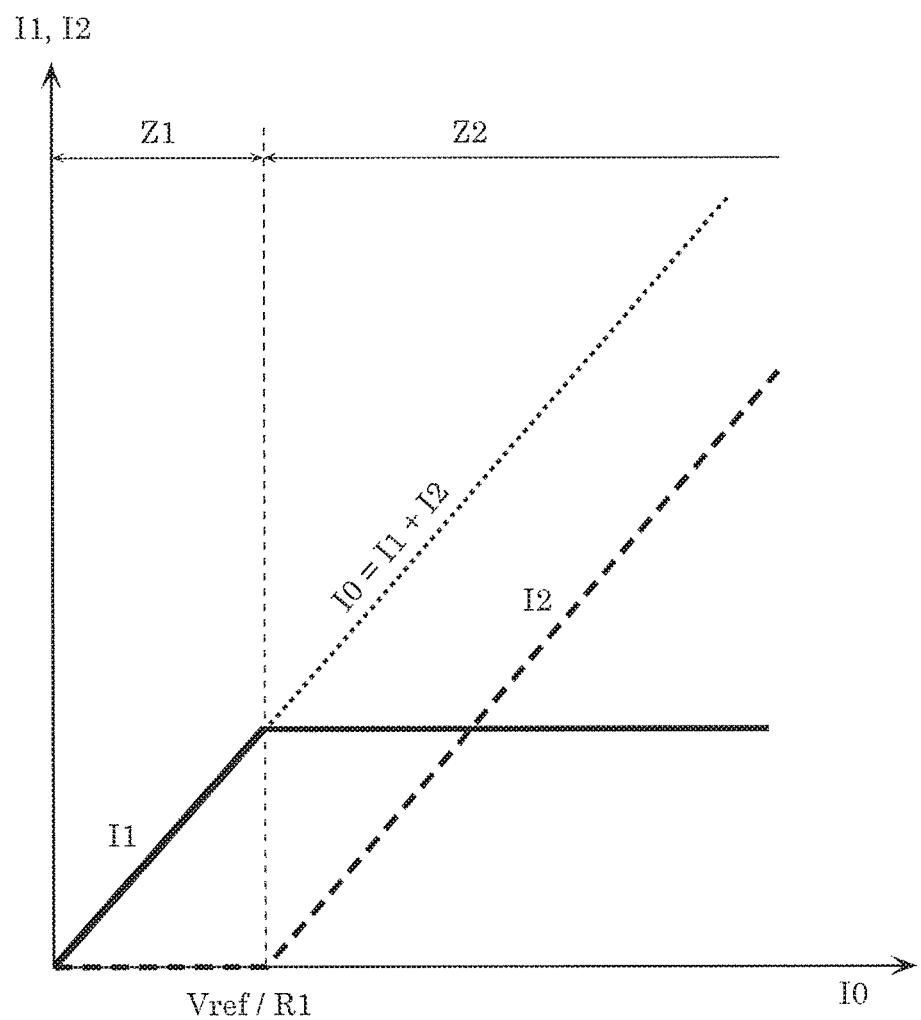
FIG. 28 is a graph illustrating an example of the relationship (dimming pattern) between respective currents flowing through a first light-emitting element column, a second light-emitting element column, and a third light-emitting element column, and a constant current, in Variation 1 of Embodiment 1.

FIG. 28 is a graph illustrating an example of the relationship (dimming pattern) between a first light-emitting element column and a second light-emitting element column, and the constant current, in the case where a constant current detector circuit is not provided (Variation 1 of Embodiment 1 and Variation 1 of Embodiment 4).

In this case, current I1 flowing through first light-emitting element column LEDG1 does not become 0 (i.e., range Z3 cannot be provided). However, since it is possible to provide range Z1 in which first light-emitting element column LEDG1 is turned ON and second light-emitting element column LEDG2 is turned OFF, this case also allows broadening of the color toning range compared to the comparative example.

(6) In Embodiments 1 to 7, a light-emitting element column may further be provided in the wiring line through which constant current I0 flows.

Figure 29:
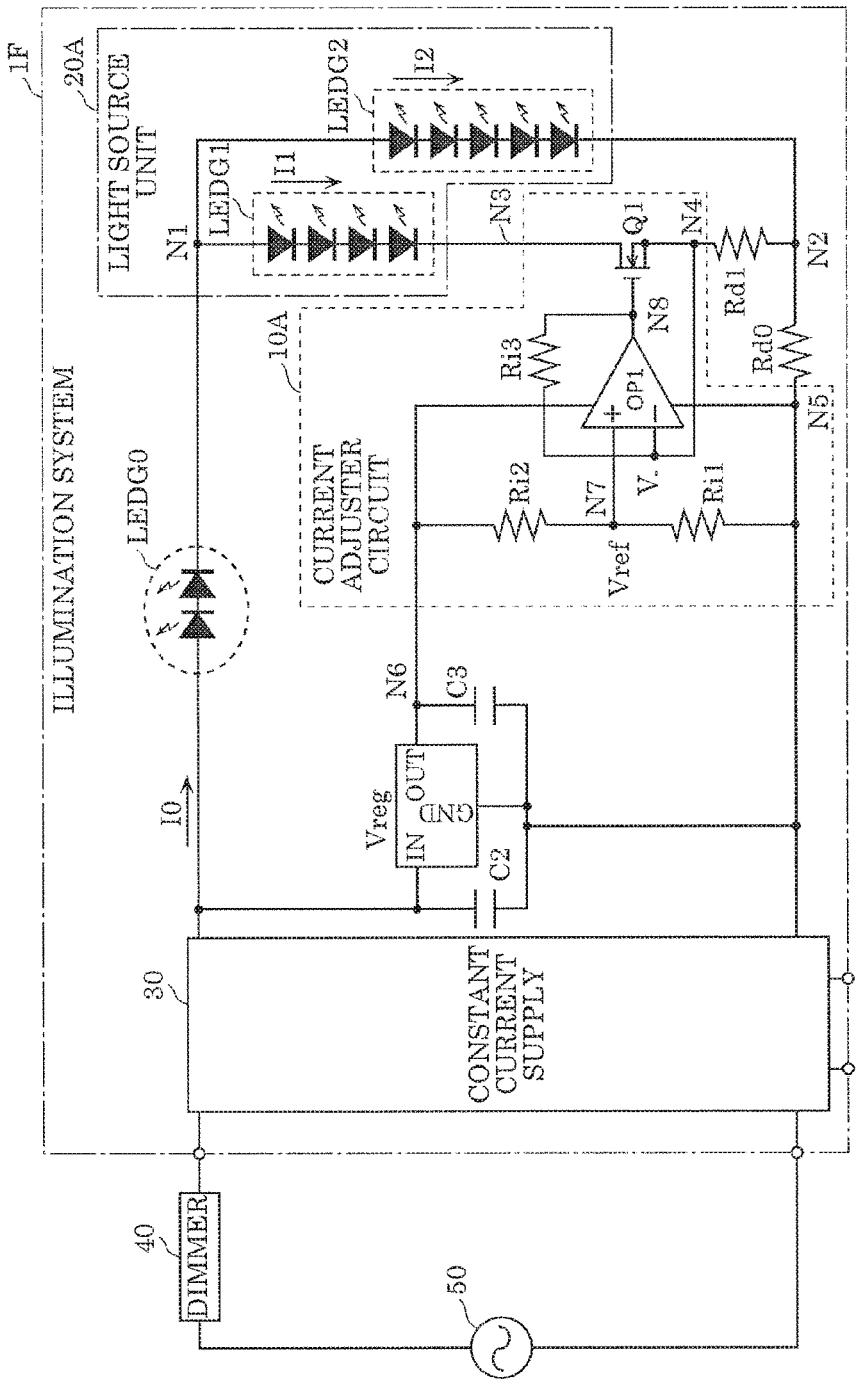
FIG. 29 is a circuit diagram illustrating an example of the circuit configuration of an illumination system in Variation 2 of Embodiment 1.

FIG. 29 is a circuit diagram illustrating an example of the circuit configuration of an illumination system in the case (Variation 2 of Embodiment 1) where a light-emitting element column is provided in the wiring line through which constant current I0 flows. Illumination system 1F illustrated in FIG. 29 includes constant current supply 30, light source unit 20A, three-terminal regulator Vreg, the first detector circuit, the constant current detector circuit, current adjuster circuit 10A, and light-emitting element column LEDG0. Other than including light-emitting element column LEDG0, everything is the same as in the foregoing embodiment. Accordingly, dimming control and light-distribution control flexibility can be improved.

(7) Although the case where the luminaire is a downlight is exemplified in Embodiments 1 to 7, the luminaire in the present disclosure can be applied to an arbitrary appliance such as a projector or an indoor light.

(8) Forms obtained by various modifications to the exemplary embodiment that can be conceived by a person of skill in the art as well as forms realized by arbitrarily combining structural components and functions in the exemplary embodiment which are within the scope of the essence of the present disclosure are included in the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination system comprising:
    a first light-emitting element column including one of a single first light-emitting element or a plurality of first light-emitting elements connected in series;
    a second light-emitting element column connected in parallel with the first light-emitting element column, and including one of a single second light-emitting element or a plurality of second light-emitting elements connected in series;
    a constant current supply that supplies a constant current to a light source unit that includes the first light-emitting element column and the second light-emitting element column;
    a first detector circuit that is connected in series with the first light-emitting element column, and detects a magnitude of current flowing through the first light-emitting element column; and
    a current adjuster circuit that adjusts the magnitude of the current flowing through the first light-emitting element column, according to the magnitude of the current detected by the first detector circuit,
    wherein the current adjuster circuit adjusts the magnitude of the current flowing through the first light-emitting element column to set a magnitude of the current flowing through the second light-emitting element column to zero, when a magnitude of the constant current is less than or equal to a first threshold value.

2. The illumination system according to claim 1, wherein a sum of forward voltages of the one of the single second light-emitting element or the plurality of second light-emitting elements included in the second light-emitting element column is greater than a sum of forward voltages of the one of the single first light-emitting element or the plurality of first light-emitting elements included in the first light-emitting element column.

3. The illumination system according to claim 1, wherein the current adjuster circuit sets the magnitude of the current flowing through the first light-emitting element column to zero, when the magnitude of the constant current is greater than or equal to a second threshold value which is greater than the first threshold value.

4. The illumination system according to claim 3, wherein the current adjuster circuit adjusts the magnitude of the current flowing through the first light-emitting column to a smaller amount as the constant current becomes bigger, when the magnitude of the constant current is greater than or equal to a third threshold value which is greater than or equal to the first threshold value.

5. The illumination system according to claim 1, wherein the current adjuster circuit compares the magnitude of the current detected by the first detector circuit with a reference value, and changes the magnitude of the current flowing through the first light-emitting element column according to a result of the comparison.

6. The illumination system according to claim 5, wherein the first detector circuit is a resistor, and the current adjuster circuit includes:
    a transistor that adjusts the magnitude of the current flowing through the first light-emitting element column; and
    a comparator amplifier circuit that compares a voltage drop in the resistor with the reference value, and applies a voltage that is in accordance with a result of the comparison to a control terminal of the transistor.

7. The illumination system according to claim 5, further comprising
    a reference value adjuster circuit that adjusts the reference value according to the magnitude of the constant current supplied from the constant current supply.

8. The illumination system according to claim 1, wherein a color temperature of the one of the single first light-emitting element or the plurality of first light-emitting elements is lower than a color temperature of the one of the single second light-emitting element or the plurality of second light-emitting elements.

9. The illumination system according to claim 1, wherein light distribution characteristics of the first light-emitting element column and light distribution characteristics of the second light-emitting element column are different.

10. A luminaire comprising:
    the illumination system according to claim 1; and
    a dimmer that adjusts a magnitude of the constant current of the constant current supply.

11. A lighting apparatus that supplies current to a plurality of light-emitting element columns, the lighting apparatus comprising:
    a common terminal;
    a plurality of branch terminals;

a constant current supply that supplies current to the plurality of light-emitting element columns such that a sum of currents flowing from the common terminal to the plurality of branch terminals is constant, when the plurality of light-emitting element columns are connected between the common terminal and a respective different one of the plurality of branch terminals; and a current adjustor circuit that adjusts a magnitude of current flowing from the common terminal to at least one of the plurality of branch terminals, wherein the plurality of light-emitting element columns include a first light-emitting element column and a second light-emitting element column, the first light-emitting element column including one of a single first light-emitting element or a plurality of first light-emitting elements connected in series and the second light-emitting element column including one of a single second light-emitting element or a plurality of second light-emitting elements connected in series, the plurality of branch terminals include a first branch terminal and a second branch terminal, the first light-emitting element column is supplied with a first current by being connected between the common terminal and the first branch terminal, the second light-emitting element column is supplied with a second current by being connected between the common terminal and the second branch terminal, and the current adjuster circuit adjusts a magnitude of the first current, wherein a sum of forward voltages of the one of the single second light-emitting element or the plurality of second light-emitting elements included in the second light-emitting element column is greater than a sum of forward voltages of the one of the single first light-emitting element or the plurality of first light-emitting elements included in the first light-emitting element column, and wherein the current adjuster circuit adjusts the magnitude of the first current to set a magnitude of the current flowing through the second light-emitting element column to zero, when the sum of the currents is less than or equal to a first threshold value.

12. The lighting apparatus according to claim 11, wherein the current adjuster circuit adjusts the magnitude of the first current based on a detected value of the first current.

13. The lighting apparatus according to claim 11, wherein the current adjuster circuit sets the magnitude of the first current to zero, when the sum of the currents is greater than or equal to a second threshold value which is greater than the first threshold value.

14. The lighting apparatus according to claim 11, wherein the current adjuster circuit adjusts the magnitude of the first current to a smaller amount as the sum of the currents becomes bigger, when the sum of the currents is greater than or equal to a third threshold value which is greater than or equal to the first threshold value.

15. The lighting apparatus according to claim 11, further comprising
a constant current detector circuit that detects a magnitude of the sum of the currents,
wherein the current adjuster circuit adjusts the magnitude of the first current according to the magnitude of the sum of the currents detected by the constant current detector circuit.

16. The lighting apparatus according to claim 11, wherein the current adjuster circuit compares the magnitude of the current detected by the first detector circuit with a reference value, and changes the magnitude of the first current according to a result of the comparison.

17. The lighting apparatus according to claim 16, further comprising
a reference value adjuster circuit that adjusts the reference value according to the magnitude of the sum of the currents.

18. The lighting apparatus according to claim 11, wherein the current adjuster circuit adjusts the first current according to the second current.

19. The lighting apparatus according to claim 11, wherein the sum of the currents is controlled by performing external control on the constant current supply.

20. The lighting apparatus according to claim 19, wherein the constant current supply includes a control signal input terminal for performing external control on the sum of the currents.

21. A luminaire comprising:
the lighting apparatus according to claim 11; and
the plurality of light-emitting element columns.

22. The luminaire according to claim 21, wherein the plurality of light-emitting element columns have mutually different color temperatures.

23. The luminaire according to claim 21, further comprising
a dimmer,
wherein the constant current supply receives input of power from an external power supply via the dimmer, and the sum of the currents is controlled using the dimmer.

* * * * *